（12） United States Patent
Chang et al.

(10) Patent No.: US 9,116,328 B2
(45) Date of Patent: Aug. 25, 2015

(54) MOBILE DEVICE AND OPTICAL IMAGING LENS THEREOF

(71) Applicant: GeniuS Electronic Optical Co., Ltd., Taichung (TW)

(72) Inventors: Kuo-Wen Chang, Taichung (TW); Sheng Wei Hsu, Taichung (TW); Tzu Chien Tang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 47 days.

(21) Appl. No.: 13/907,405

(22) Filed: May 31, 2013

(65) Prior Publication Data

US 2014/0184874 A1    Jul. 3, 2014

(30) Foreign Application Priority Data

Dec. 28, 2012  (CN) ................................ 1011 5 1133

(51) Int. Cl.
| | |
|---|---|
| *G02B 13/18* | (2006.01) |
| *G02B 13/00* | (2006.01) |
| *G02B 9/60* | (2006.01) |
| *G02B 13/04* | (2006.01) |

(52) U.S. Cl.
CPC .............. *G02B 13/0045* (2013.01); *G02B 9/60* (2013.01); *G02B 13/04* (2013.01)

(58) Field of Classification Search
CPC ............ G02B 9/00; G02B 9/60; G02B 13/00; G02B 13/0015; G02B 13/002; G02B 13/0045; G02B 13/18
USPC ................... 359/714, 754, 763–766
See application file for complete search history.

(56) References Cited

U.S. PATENT DOCUMENTS

| | | | |
|---|---|---|---|
| 8,179,614 B1 | 5/2012 | Tsai | |
| 8,179,615 B1* | 5/2012 | Tang et al. | ..................... 359/714 |
| 8,482,863 B2 | 7/2013 | Tsai et al. | |
| 2010/0033616 A1 | 2/2010 | Huang et al. | |
| 2010/0253829 A1 | 10/2010 | Shinohara | |
| 2010/0254029 A1 | 10/2010 | Shinohara | |
| 2011/0249346 A1 | 10/2011 | Tang | |
| 2011/0249348 A1 | 10/2011 | Kubota | |
| 2011/0273611 A1* | 11/2011 | Matsusaka et al. | ........... 348/345 |
| 2011/0310494 A1 | 12/2011 | Ise | |
| 2012/0105704 A1 | 5/2012 | Huang | |
| 2012/0140104 A1* | 6/2012 | Ozaki | ........................... 348/335 |
| 2012/0154929 A1 | 6/2012 | Tsai | |
| 2012/0162784 A1 | 6/2012 | Tang | |
| 2012/0188655 A1 | 7/2012 | Tsai | |
| 2012/0212660 A1* | 8/2012 | Tang et al. | ..................... 348/345 |
| 2012/0218647 A1 | 8/2012 | Yonezawa | |

(Continued)

FOREIGN PATENT DOCUMENTS

| | | |
|---|---|---|
| JP | 2010-237407 A | 10/2010 |
| JP | 4947235 A | 4/2012 |

(Continued)

*Primary Examiner* — Thong Nguyen
(74) *Attorney, Agent, or Firm* — Baker & McKenzie LLP

(57) ABSTRACT

Present embodiments provide for a mobile device and an optical imaging lens thereof. The optical imaging lens comprises five lens elements positioned sequentially from an object side to an image side. Though controlling the convex or concave shape of the surfaces, the refracting power of the lens elements and/or equations between parameters, the optical imaging lens shows better optical characteristics and the total length of the optical imaging lens is shortened.

14 Claims, 24 Drawing Sheets

(56) References Cited

U.S. PATENT DOCUMENTS

| | | | |
|---|---|---|---|
| 2013/0016278 A1* | 1/2013 | Matsusaka et al. | 348/360 |
| 2013/0033765 A1* | 2/2013 | Tsai et al. | 359/714 |
| 2013/0057968 A1* | 3/2013 | Tang et al. | 359/714 |
| 2014/0211325 A1* | 7/2014 | Lai | 359/713 |

FOREIGN PATENT DOCUMENTS

| | | |
|---|---|---|
| TW | M369459 U1 | 11/2009 |
| TW | 201224571 A1 | 6/2012 |
| TW | I406027 B | 8/2013 |

* cited by examiner

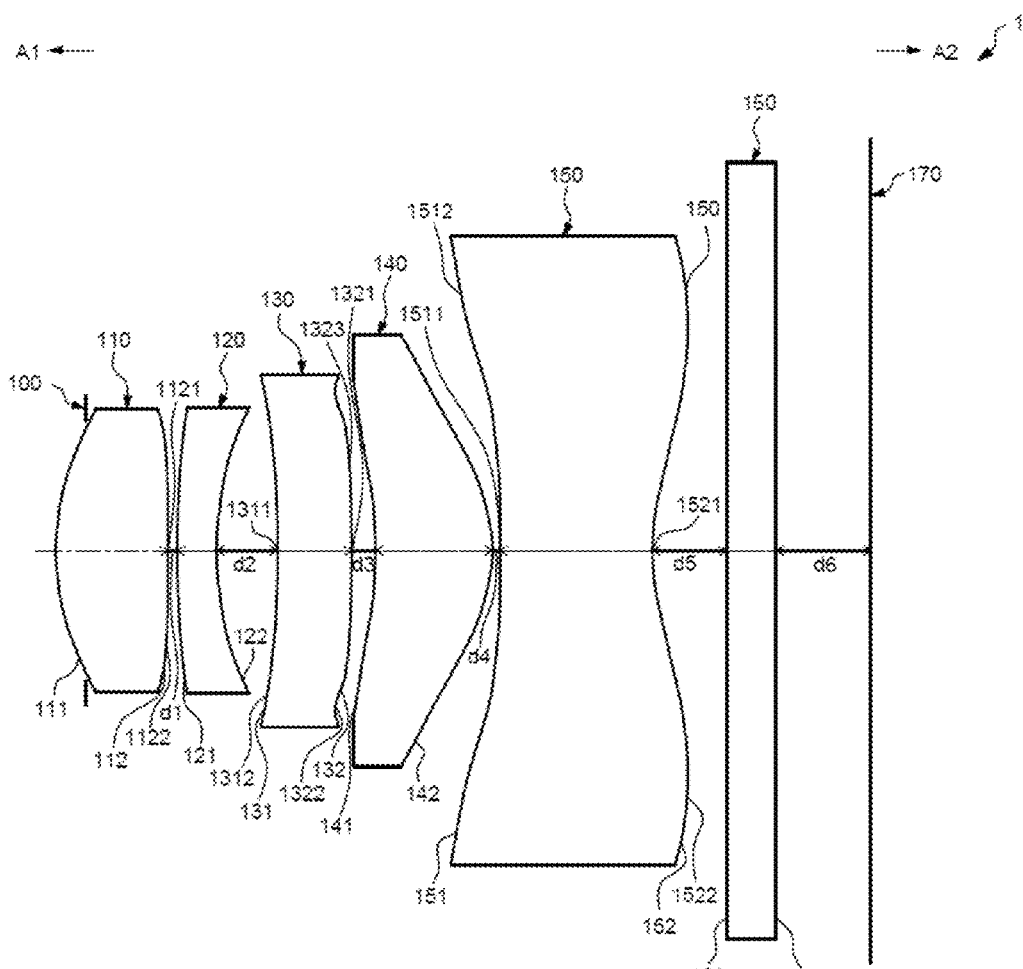
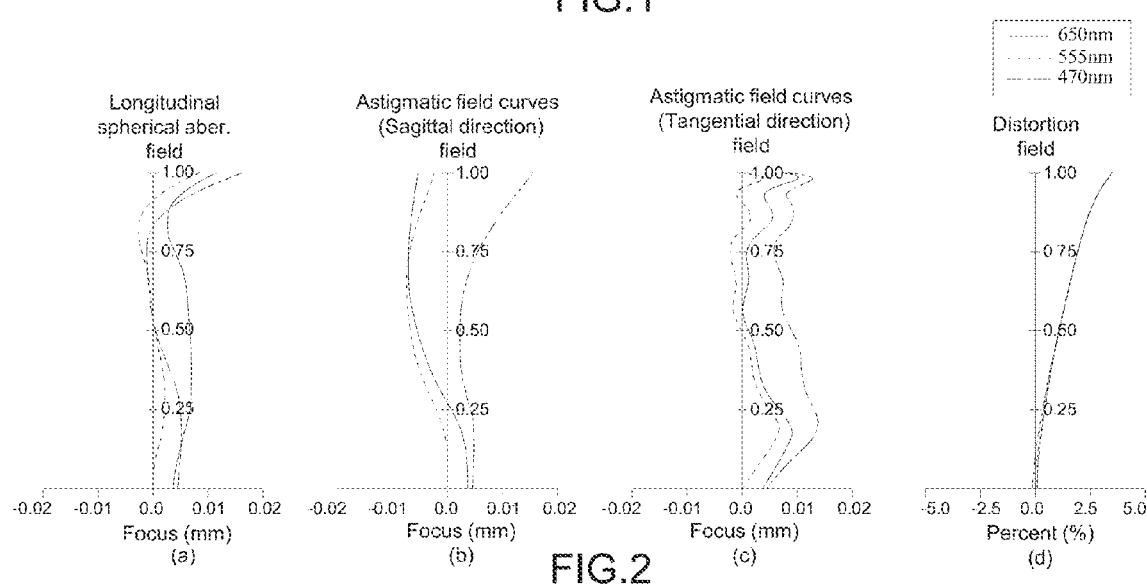

| f(Focus)=3.883mm, HFOV(Half angular field of view)= 33.611deg., Fno=2.25 ||||||||
|---|---|---|---|---|---|---|---|
| Surface # | | Radius | Thickness | Refractive index | Abbe number | Material | Focus |
| - | Object | ∞ | 10000 | | | | |
| 100 | Aperture stop | ∞ | -0.174736194 | | | | |
| 111 | 1st lens element | 1.6050579 | 0.67046027 | 1.5459 | 56.1138 | plastic | 2.527 |
| 112 | | -8.372732 | 0.05 | | | | |
| 121 | 2nd lens element | 8.7649571 | 0.237174371 | 1.6563 | 21.598 | plastic | -4.599 |
| 122 | | 2.2214476 | 0.364885651 | | | | |
| 131 | 3rd lens element | 369.91738 | 0.43378484 | 1.6402 | 23.908 | plastic | -55.371 |
| 132 | | 32.33504 | 0.150960867 | | | | |
| 141 | 4th lens element | -2.306582 | 0.692251829 | 1.5363 | 56.2727 | plastic | 3.008 |
| 142 | | -1.048781 | 0.050320287 | | | | |
| 151 | 5th lens element | 24.844145 | 0.905765199 | 1.5363 | 56.2727 | plastic | -2.798 |
| 152 | | 1.3972404 | 0.440034343 | | | | |
| 161 | IR cut filter | ∞ | 0.3 | | | | |
| 162 | | ∞ | 0.562137456 | | | | |
| 170 | Image plane | ∞ | | | | | |

FIG.4

| Aspherical parameters | | | | | |
|---|---|---|---|---|---|
| Surface # | 111 | 112 | 121 | 122 | 131 |
| K | -6.26E+00 | 0.00E+00 | 0.00E+00 | -1.46E+01 | 0.00E+00 |
| $a_4$ | 1.77E-01 | 1.28E-01 | 1.18E-01 | 1.39E-01 | -1.24E-01 |
| $a_6$ | -1.35E-01 | -3.07E-01 | -1.88E-01 | -8.23E-02 | 6.72E-03 |
| $a_8$ | 5.33E-02 | 2.26E-01 | 1.47E-01 | 1.32E-01 | 2.56E-03 |
| $a_{10}$ | 2.72E-02 | -1.88E-01 | -1.83E-01 | -1.78E-01 | 3.85E-04 |
| $a_{12}$ | -7.53E-02 | 7.54E-02 | 1.37E-01 | 1.48E-01 | 0.00E+00 |
| Surface # | 132 | 141 | 142 | 151 | 152 |
| K | 0.00E+00 | -6.46E+00 | -7.35E-01 | -3.85E+01 | -5.59E+00 |
| $a_4$ | -9.79E-02 | 7.17E-02 | 4.53E-01 | -4.03E-01 | -8.04E-01 |
| $a_6$ | 1.29E-02 | 2.27E-03 | 2.44E-02 | 1.56E-01 | 1.27E-01 |
| $a_8$ | 3.51E-03 | 7.53E-05 | -1.80E-03 | -1.91E-02 | -3.05E-02 |
| $a_{10}$ | 0.00E+00 | -9.02E-04 | -2.76E-03 | -3.09E-03 | 1.21E-02 |
| $a_{12}$ | 0.00E+00 | 1.45E-04 | 2.38E-04 | 2.80E-04 | -5.95E-03 |
| $a_{14}$ | | | -7.18E-05 | 3.30E-03 | 4.54E-04 |
| $a_{16}$ | | | | 1.28E-03 | -1.50E-03 |
| $a_{18}$ | | | | | -1.74E-04 |
| $a_{20}$ | | | | | -2.85E-04 |

FIG.5

| f(Focus)=3.9523mm, HFOV(Half angular field of view)=33.1540 deg., Fno=2.25 ||||||||
|---|---|---|---|---|---|---|---|
| Surface # | | Radius | Thickness | Refractive index | Abbe number | Material | Focus |
| - | Object | ∞ | 10000 | | | | |
| 200 | Aperture stop | ∞ | -0.187767874 | | | | |
| 211 | 1st lens element | 1.624886086 | 0.677910289 | 1.5459 | 56.1138 | plastic | 2.5369 |
| 212 | | -7.997413869 | 0.05 | | | | |
| 221 | 2nd lens element | 9.263043198 | 0.25878377 | 1.6563 | 21.5981 | plastic | -4.4152 |
| 222 | | 2.182928334 | 0.315478996 | | | | |
| 231 | 3rd lens element | 9.217461318 | 0.337671383 | 1.6402 | 23.9009 | plastic | 98.0188 |
| 232 | | 10.64992849 | 0.136055704 | | | | |
| 241 | 4th lens element | -2.882475561 | 1.003745904 | 1.5363 | 56.2727 | plastic | 2.829 |
| 242 | | -1.114912292 | 0.05 | | | | |
| 251 | 5th lens element | 63.48140081 | 0.816315444 | 1.5363 | 56.2727 | plastic | -2.5002 |
| 252 | | 1.307385378 | 0.440034343 | | | | |
| 261 | IR cut filter | ∞ | 0.3 | | | | |
| 262 | | ∞ | 0.562137456 | | | | |
| 270 | Image plane | ∞ | 0.005251004 | | | | |

FIG.8

| Aspherical parameters | | | | | |
|---|---|---|---|---|---|
| Surface # | 211 | 212 | 221 | 222 | 231 |
| K | -6.43E+00 | 0.00E+00 | 0.00E+00 | -1.43E+01 | 0.00E+00 |
| $a_4$ | 1.76E-01 | 1.29E-01 | 1.18E-01 | 1.40E-01 | -1.25E-01 |
| $a_6$ | -1.34E-01 | -3.06E-01 | -1.90E-01 | -8.14E-02 | 5.37E-03 |
| $a_8$ | 5.45E-02 | 2.27E-01 | 1.44E-01 | 1.30E-01 | 2.31E-03 |
| $a_{10}$ | 2.70E-02 | -1.87E-01 | -1.86E-01 | -1.85E-01 | 3.73E-04 |
| $a_{12}$ | -7.25E-02 | 7.26E-02 | 1.34E-01 | 1.39E-01 | |
| Surface # | 232 | 241 | 242 | 251 | 252 |
| K | 0.00E+00 | -6.11E+00 | -7.07E-01 | -3.85E+01 | -5.55E+00 |
| $a_4$ | -9.66E-02 | 6.65E-02 | 4.35E-01 | -3.62E-01 | -7.79E-01 |
| $a_6$ | 1.27E-02 | -2.61E-03 | 1.81E-02 | 1.47E-01 | 1.25E-01 |
| $a_8$ | 4.26E-03 | -6.15E-04 | -7.10E-04 | -3.26E-02 | -3.28E-02 |
| $a_{10}$ | 1.29E-04 | -6.20E-04 | -2.01E-03 | -2.13E-04 | 1.21E-02 |
| $a_{12}$ | 1.85E-04 | 3.83E-04 | 2.40E-04 | -2.24E-03 | -5.79E-03 |
| $a_{14}$ | | | | 1.44E-03 | 4.12E-04 |
| $a_{16}$ | | | | 5.61E-04 | -1.33E-03 |
| $a_{18}$ | | | | | -1.45E-04 |
| $a_{20}$ | | | | | -2.15E-04 |

FIG.9

| f(Focus)=3.6218mm, HFOV(Half angular field of view)=35.5790 deg., Fno=2.25 ||||||||
|---|---|---|---|---|---|---|---|
| Surface # | | Radius | Thickness | Refractive index | Abbe number | Material | Focus |
| - | Object | ∞ | 10000 | | | | |
| 300 | Aperture stop | ∞ | -0.187767874 | | | | |
| 311 | 1st lens element | 1.624886086 | 0.677910289 | 1.5459 | 56.1138 | plastic | 2.5369 |
| 312 | | -7.997413869 | 0.05 | | | | |
| 321 | 2nd lens element | 9.263043198 | 0.25878377 | 1.6563 | 21.5981 | plastic | -4.4152 |
| 322 | | 2.182928334 | 0.315478996 | | | | |
| 331 | 3rd lens element | 9.217461318 | 0.337671383 | 1.6402 | 23.9009 | plastic | 98.0188 |
| 332 | | 10.64992849 | 0.136055704 | | | | |
| 341 | 4th lens element | -2.882475561 | 1.003745904 | 1.5363 | 56.2727 | plastic | 2.829 |
| 342 | | -1.114912292 | 0.05 | | | | |
| 351 | 5th lens element | 63.48140081 | 0.816315444 | 1.5363 | 56.2727 | plastic | -2.5002 |
| 352 | | 1.307385378 | 0.440034343 | | | | |
| 361 | IR cut filter | ∞ | 0.3 | | | | |
| 362 | | ∞ | 0.562137456 | | | | |
| 370 | Image plane | ∞ | 0.005251004 | | | | |

FIG.12

| Aspherical parameters | | | | | |
|---|---|---|---|---|---|
| Surface # | 311 | 312 | 321 | 322 | 331 |
| K | -6.28E+00 | 0.00E+00 | 0.00E+00 | -1.31E+01 | 0.00E+00 |
| $a_4$ | 1.80E-01 | 1.28E-01 | 1.17E-01 | 1.42E-01 | -1.27E-01 |
| $a_6$ | -1.35E-01 | -3.10E-01 | -1.94E-01 | -8.04E-02 | 5.21E-03 |
| $a_8$ | 5.09E-02 | 2.22E-01 | 1.42E-01 | 1.34E-01 | 2.78E-03 |
| $a_{10}$ | 2.70E-02 | -1.92E-01 | -1.82E-01 | -1.76E-01 | 3.28E-04 |
| $a_{12}$ | -8.54E-02 | 7.69E-02 | 1.46E-01 | 1.37E-01 | |
| Surface # | 332 | 341 | 342 | 351 | 352 |
| K | 0.00E+00 | -5.80E+00 | -7.32E-01 | -3.85E+01 | -5.47E+00 |
| $a_4$ | -8.92E-02 | 6.90E-02 | 4.55E-01 | -4.57E-01 | -8.77E-01 |
| $a_6$ | 1.30E-02 | 3.49E-03 | 1.93E-02 | 1.28E-01 | 1.15E-01 |
| $a_8$ | 4.84E-03 | 2.72E-04 | 2.08E-03 | -2.16E-02 | -3.13E-02 |
| $a_{10}$ | | -8.43E-04 | -3.79E-03 | 9.88E-04 | 1.27E-02 |
| $a_{12}$ | | 1.55E-04 | 2.24E-04 | -2.58E-03 | -5.58E-03 |
| $a_{14}$ | | | | 2.82E-04 | 4.79E-04 |
| $a_{16}$ | | | | 3.48E-04 | -1.34E-03 |
| $a_{18}$ | | | | | -9.87E-05 |
| $a_{20}$ | | | | | -2.34E-04 |

FIG.13

| f(Focus)=3.8091mm, HFOV(Half angular field of view)=34.1231 deg., Fno=2.25 ||||||||
|---|---|---|---|---|---|---|---|
| Surface # | | Radius | Thickness | Refractive index | Abbe number | Material | Focus |
| - | Object | ∞ | 10000 | | | | |
| 400 | Aperture stop | ∞ | -0.123989512 | | | | |
| 411 | 1st lens element | 1.568527215 | 0.641361654 | 1.5459 | 56.1138 | plastic | 2.4873 |
| 412 | | -8.651098059 | 0.05 | | | | |
| 421 | 2nd lens element | 7.541829364 | 0.231608742 | 1.6563 | 21.5981 | plastic | -4.7057 |
| 422 | | 2.164555236 | 0.491747771 | | | | |
| 431 | 3rd lens element | -20.11627047 | 0.407901878 | 1.6402 | 23.9009 | plastic | -29.6972 |
| 432 | | 349.4269221 | 0.118297697 | | | | |
| 441 | 4th lens element | -2.284119403 | 0.769332233 | 1.5363 | 56.2727 | plastic | 2.832 |
| 442 | | -1.019548401 | 0.057509623 | | | | |
| 451 | 5th lens element | 5.3257371 | 0.703871339 | 1.5363 | 56.2727 | plastic | -2.8074 |
| 452 | | 1.119692616 | 0.440034343 | | | | |
| 461 | IR cut filter | ∞ | 0.3 | | | | |
| 462 | | ∞ | 0.562137456 | | | | |
| 470 | Image plane | ∞ | 0.005251004 | | | | |

FIG.16

| Aspherical parameters | | | | | |
|---|---|---|---|---|---|
| Surface # | 411 | 412 | 421 | 422 | 431 |
| K | -5.87E+00 | -9.11E+00 | 0.00E+00 | -1.28E+01 | 0.00E+00 |
| $a_4$ | 1.80E-01 | 1.30E-01 | 1.13E-01 | 1.43E-01 | -1.25E-01 |
| $a_6$ | -1.30E-01 | -3.00E-01 | -1.90E-01 | -7.74E-02 | 5.41E-03 |
| $a_8$ | 5.47E-02 | 2.24E-01 | 1.54E-01 | 1.34E-01 | 2.13E-03 |
| $a_{10}$ | 2.39E-02 | -1.93E-01 | -1.81E-01 | -1.70E-01 | 3.36E-04 |
| $a_{12}$ | -7.92E-02 | 7.06E-02 | 1.36E-01 | 1.56E-01 | |
| Surface # | 432 | 441 | 442 | 451 | 452 |
| K | 0.00E+00 | -5.86E+00 | -7.33E-01 | -3.85E+01 | -5.59E+00 |
| $a_4$ | -1.10E-01 | 6.73E-02 | 4.88E-01 | -4.29E-01 | -8.51E-01 |
| $a_6$ | 1.21E-02 | 3.23E-03 | 1.87E-02 | 1.33E-01 | 1.23E-01 |
| $a_8$ | 3.38E-03 | 7.94E-04 | -2.02E-05 | -2.12E-02 | -3.19E-02 |
| $a_{10}$ | | -9.29E-04 | -2.42E-03 | 2.25E-03 | 1.22E-02 |
| $a_{12}$ | | 1.43E-04 | -6.84E-05 | -2.35E-03 | -5.04E-03 |
| $a_{14}$ | | | 8.01E-05 | 1.19E-03 | 1.74E-03 |
| $a_{16}$ | | | | -2.72E-04 | -9.28E-04 |
| $a_{18}$ | | | | | 1.57E-04 |
| $a_{20}$ | | | | | -1.52E-04 |

FIG.17

| f(Focus)=3.7251mm, HFOV(Half angular field of view)= 35.2468deg., Fno=2.25 | | | | | | | |
|---|---|---|---|---|---|---|---|
| Surface # | | Radius | Thickness | Refractive index | Abbe number | Material | Focus |
| - | Object | ∞ | 10000 | | | | |
| 500 | Aperture stop | ∞ | -0.156791077 | | | | |
| 511 | 1st lens element | 1.60807462 | 0.607990057 | 1.5459 | 56.1138 | plastic | 2.5885 |
| 512 | | -10.1009648 | 0.05 | | | | |
| 521 | 2nd lens element | 7.541192969 | 0.224934914 | 1.6563 | 21.5981 | plastic | -4.6715 |
| 522 | | 2.154097787 | 0.392993642 | | | | |
| 531 | 3rd lens element | 28.21251601 | 0.313046248 | 1.6402 | 23.9009 | plastic | 5846.8019 |
| 532 | | 28.30364358 | 0.225186451 | | | | |
| 541 | 4th lens element | -2.03703134 | 0.720536056 | 1.5363 | 56.2727 | plastic | 2.8582 |
| 542 | | -0.98273735 | 0.05 | | | | |
| 551 | 5th lens element | 9.997427364 | 0.875 | 1.5363 | 56.2727 | plastic | -2.7894 |
| 552 | | 1.261585186 | 0.440034343 | | | | |
| 561 | IR cut filter | ∞ | 0.3 | | | | |
| 562 | | ∞ | 0.562137456 | | | | |
| 570 | Image plane | ∞ | 0.005251004 | | | | |

FIG.20

| Aspherical parameters | | | | | |
|---|---|---|---|---|---|
| Surface # | 511 | 512 | 521 | 522 | 531 |
| K | -6.38E+00 | 0.00E+00 | 0.00E+00 | -1.27E+01 | 0.00E+00 |
| $a_4$ | 1.79E-01 | 1.28E-01 | 1.18E-01 | 1.42E-01 | -1.27E-01 |
| $a_6$ | -1.36E-01 | -3.10E-01 | -1.93E-01 | -8.20E-02 | 5.18E-03 |
| $a_8$ | 5.01E-02 | 2.21E-01 | 1.43E-01 | 1.34E-01 | 3.05E-03 |
| $a_{10}$ | 2.63E-02 | -1.93E-01 | -1.82E-01 | -1.75E-01 | 3.84E-04 |
| $a_{12}$ | -8.46E-02 | 7.68E-02 | 1.45E-01 | 1.41E-01 | |
| Surface # | 532 | 541 | 542 | 551 | 552 |
| K | 0.00E+00 | -5.78E+00 | -7.31E-01 | -3.85E+01 | -5.84E+00 |
| $a_4$ | -8.98E-02 | 6.96E-02 | 4.53E-01 | -4.45E-01 | -8.61E-01 |
| $a_6$ | 1.31E-02 | 3.45E-03 | 2.03E-02 | 1.27E-01 | 1.07E-01 |
| $a_8$ | 4.93E-03 | 4.82E-04 | 2.13E-03 | -2.01E-02 | -3.16E-02 |
| $a_{10}$ | | -8.23E-04 | -3.51E-03 | 6.40E-04 | 1.24E-02 |
| $a_{12}$ | | 1.55E-04 | 2.56E-04 | -1.80E-03 | -5.22E-03 |
| $a_{14}$ | | | | 7.42E-04 | 7.47E-04 |
| $a_{16}$ | | | | 5.43E-04 | -1.23E-03 |
| $a_{18}$ | | | | | -1.80E-05 |
| $a_{20}$ | | | | | -2.25E-04 |

FIG.21

| f(Focus)=3.5270mm, HFOV(Half angular field of view)=36.4091 deg., Fno=2.25 | | | | | | | |
|---|---|---|---|---|---|---|---|
| Surface # | | Radius | Thickness | Refractive index | Abbe number | Material | Focus |
| - | Object | ∞ | 10000 | | | | |
| 600 | Aperture stop | ∞ | -0.136719859 | | | | |
| 611 | 1st lens element | 1.58193712 | 0.670120371 | 1.5459 | 56.1138 | plastic | 2.4769 |
| 612 | | -7.919202812 | 0.052479479 | | | | |
| 621 | 2nd lens element | 8.98263557 | 0.234038921 | 1.6563 | 21.5981 | plastic | -4.3796 |
| 622 | | 2.155202535 | 0.388800442 | | | | |
| 631 | 3rd lens element | 23.7149395 | 0.343975418 | 1.6402 | 23.9009 | plastic | 271.8416 |
| 632 | | 27.30067507 | 0.23601647 | | | | |
| 641 | 4th lens element | -2.053368501 | 0.626612399 | 1.5363 | 56.2727 | plastic | 3.1262 |
| 642 | | -1.017830136 | 0.177668821 | | | | |
| 651 | 5th lens element | 5.919730202 | 0.728430353 | 1.5363 | 56.2727 | plastic | -2.8832 |
| 652 | | 1.173447174 | 0.4 | | | | |
| 661 | IR cut filter | ∞ | 0.3 | | | | |
| 662 | | ∞ | 0.363082145 | | | | |
| 670 | Image plane | ∞ | 0 | | | | |

FIG.24

| Aspherical parameters | | | | | |
|---|---|---|---|---|---|
| Surface # | 611 | 612 | 621 | 622 | 631 |
| K | -6.08E+00 | 5.09E+00 | 0.00E+00 | -1.28E+01 | 0.00E+00 |
| $a_4$ | 1.79E-01 | 1.28E-01 | 1.12E-01 | 1.41E-01 | -1.25E-01 |
| $a_6$ | -1.34E-01 | -3.07E-01 | -1.93E-01 | -7.72E-02 | 4.66E-03 |
| $a_8$ | 5.21E-02 | 2.24E-01 | 1.46E-01 | 1.34E-01 | 2.38E-03 |
| $a_{10}$ | 2.64E-02 | -1.89E-01 | -1.83E-01 | -1.74E-01 | 2.71E-04 |
| $a_{12}$ | -7.80E-02 | 7.59E-02 | 1.43E-01 | 1.41E-01 | |
| Surface # | 632 | 641 | 642 | 651 | 652 |
| K | 0.00E+00 | -5.86E+00 | -7.23E-01 | -3.85E+01 | -5.59E+00 |
| $a_4$ | -1.00E-01 | 6.30E-02 | 4.59E-01 | -5.05E-01 | -8.75E-01 |
| $a_6$ | 1.10E-02 | 3.79E-03 | 1.43E-02 | 1.13E-01 | 6.17E-02 |
| $a_8$ | 4.32E-03 | 2.13E-04 | -1.14E-03 | -2.44E-02 | -3.63E-02 |
| $a_{10}$ | | -8.13E-04 | -3.74E-03 | 1.01E-03 | 8.57E-03 |
| $a_{12}$ | | 8.62E-05 | 4.24E-04 | -1.34E-03 | -4.54E-03 |
| $a_{14}$ | | | 6.90E-05 | 9.02E-04 | 5.78E-04 |
| $a_{16}$ | | | | -4.01E-04 | -4.24E-04 |
| $a_{18}$ | | | | | 2.19E-04 |

FIG.25

| f(Focus)=3.7773mm, HFOV(Half angular field of view)=34.3774 deg., Fno=2.25 | | | | | | | |
|---|---|---|---|---|---|---|---|
| Surface # | | Radius | Thickness | Refractive index | Abbe number | Material | Focus |
| - | Object | ∞ | 10000 | | | | |
| 700 | Aperture stop | ∞ | -0.175759446 | | | | |
| 711 | 1st lens element | 1.606905843 | 0.654948483 | 1.5459 | 56.1138 | plastic | 2.5624 |
| 712 | | -9.251012655 | 0.05 | | | | |
| 721 | 2nd lens element | 8.639734233 | 0.235522607 | 1.6563 | 21.5981 | plastic | -4.228 |
| 722 | | 2.07773494 | 0.359327461 | | | | |
| 731 | 3rd lens element | 27.91816836 | 0.343525644 | 1.6402 | 23.9009 | plastic | 80.0199 |
| 732 | | 61.05651496 | 0.389332418 | | | | |
| 741 | 4th lens element | -2.150429237 | 0.593400265 | 1.5363 | 56.2727 | plastic | 3.0372 |
| 742 | | -1.016169791 | 0.05 | | | | |
| 751 | 5th lens element | 4.721951786 | 0.722207981 | 1.5363 | 56.2727 | plastic | -2.9115 |
| 752 | | 1.110838198 | 0.440034343 | | | | |
| 761 | IR cut filter | ∞ | 0.3 | | | | |
| 762 | | ∞ | 0.562137456 | | | | |
| 770 | Image plane | ∞ | 0.005251004 | | | | |

FIG.28

| Aspherical parameters | | | | | |
|---|---|---|---|---|---|
| Surface # | 711 | 712 | 721 | 722 | 731 |
| K | -6.28E+00 | -3.61E+01 | -1.42E+00 | -1.26E+01 | -5.32E-12 |
| $a_4$ | 1.78E-01 | 1.32E-01 | 1.16E-01 | 1.38E-01 | -1.20E-01 |
| $a_6$ | -1.34E-01 | -3.10E-01 | -1.86E-01 | -8.24E-02 | 5.91E-03 |
| $a_8$ | 5.37E-02 | 2.24E-01 | 1.47E-01 | 1.38E-01 | 2.09E-03 |
| $a_{10}$ | 2.71E-02 | -1.88E-01 | -1.85E-01 | -1.75E-01 | 2.29E-04 |
| $a_{12}$ | -7.35E-02 | 7.58E-02 | 1.38E-01 | 1.33E-01 | |
| Surface # | 732 | 741 | 742 | 751 | 752 |
| K | 1.06E-10 | -4.25E+00 | -7.36E-01 | -3.85E+01 | -5.41E+00 |
| $a_4$ | -9.56E-02 | 6.13E-02 | 4.63E-01 | -4.90E-01 | -8.67E-01 |
| $a_6$ | 1.41E-02 | 4.84E-03 | 1.81E-02 | 1.31E-01 | 1.06E-01 |
| $a_8$ | 3.22E-03 | 1.27E-03 | 1.95E-03 | -1.92E-02 | -3.40E-02 |
| $a_{10}$ | | -1.14E-03 | -3.22E-03 | 3.01E-03 | 1.38E-02 |
| $a_{12}$ | | 1.55E-04 | 3.76E-04 | -3.60E-03 | -4.98E-03 |
| $a_{14}$ | | | | -3.74E-05 | 7.99E-04 |
| $a_{16}$ | | | | 2.45E-04 | -1.09E-03 |
| $a_{18}$ | | | | | -3.30E-05 |
| $a_{20}$ | | | | | -1.63E-04 |

FIG.29

| Embodiment | 1st Embodiment | 2nd Embodiment | 3rd Embodiment | 4th Embodiment |
|---|---|---|---|---|
| AAG | 0.616 | 0.552 | 0.669 | 0.718 |
| CT5/AC45 | 18.000 | 16.326 | 9.000 | 12.239 |
| CT5/AC34 | 6.000 | 6.000 | 3.977 | 5.950 |
| CT5/AAG | 1.470 | 1.480 | 1.100 | 0.981 |
| CT4+CT5/AAG | 2.593 | 3.300 | 2.251 | 2.053 |
| CT5/AC12 | 18.115 | 16.326 | 14.723 | 14.077 |
| CT5/CT2 | 3.819 | 3.154 | 2.986 | 3.039 |
| CT4+CT5/AC34 | 10.586 | 13.377 | 8.139 | 12.453 |
| AAG/CT2 | 2.598 | 2.131 | 2.714 | 3.098 |
| CT5/CT3 | 2.088 | 2.417 | 2.302 | 1.726 |
| AC45/AC12 | 1.006 | 1.000 | 1.636 | 1.150 |

| Embodiment | 5th Embodiment | 6th Embodiment | 7th Embodiment |
|---|---|---|---|
| AAG | 0.718 | 0.855 | 0.849 |
| CT5/AC45 | 17.500 | 4.100 | 14.444 |
| CT5/AC34 | 3.886 | 3.086 | 1.855 |
| CT5/AAG | 1.218 | 0.852 | 0.851 |
| CT4+CT5/AAG | 2.222 | 1.585 | 1.550 |
| CT5/AC12 | 17.500 | 13.880 | 14.444 |
| CT5/CT2 | 3.890 | 3.112 | 3.066 |
| CT4+CT5/AC34 | 7.085 | 5.741 | 3.379 |
| AAG/CT2 | 3.193 | 3.653 | 3.603 |
| CT5/CT3 | 2.795 | 2.118 | 2.102 |
| AC45/AC12 | 1.000 | 3.385 | 1.000 |

FIG.30

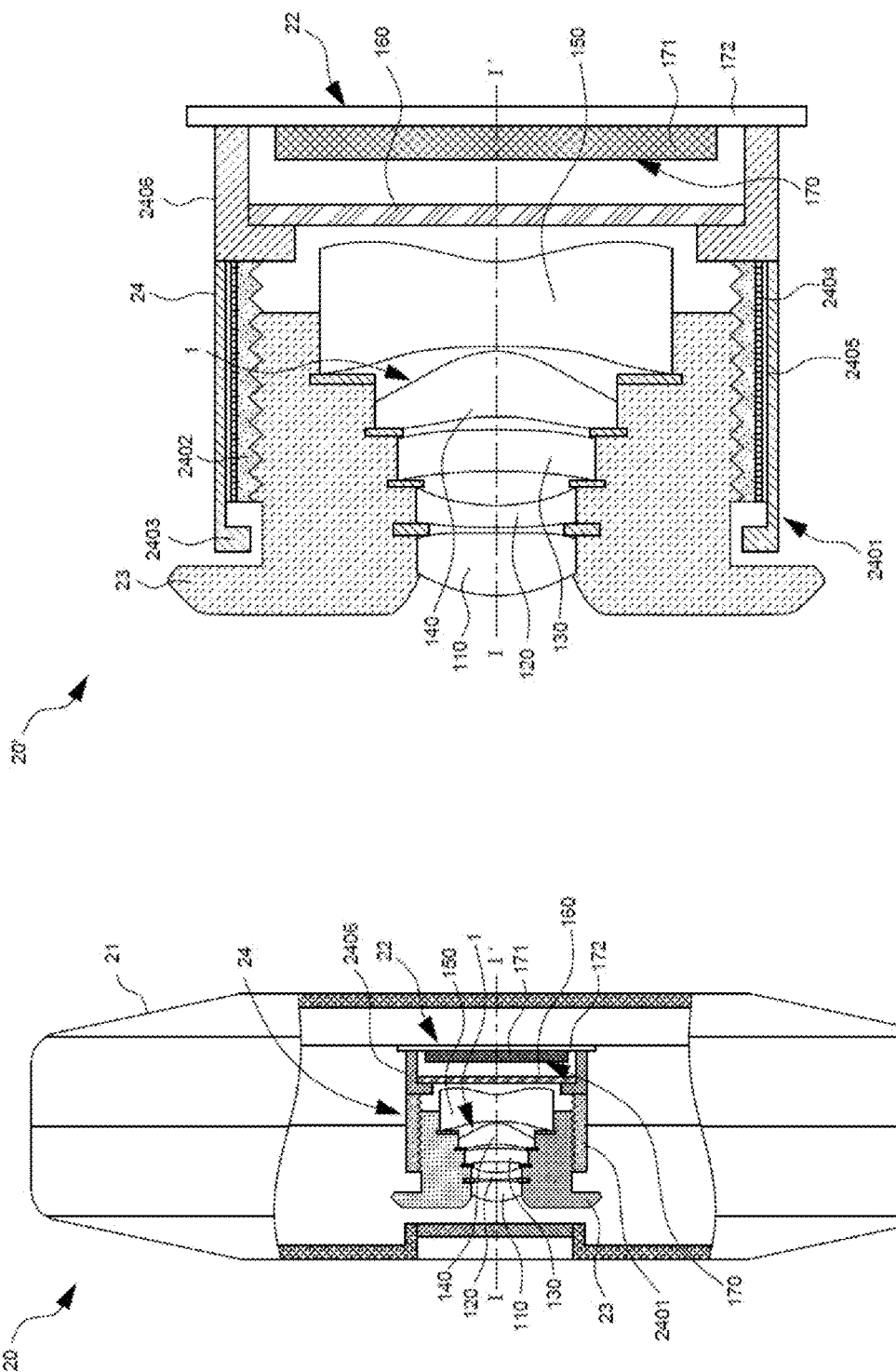

MOBILE DEVICE AND OPTICAL IMAGING LENS THEREOF

INCORPORATION BY REFERENCE

This application claims priority from R.O.C. Patent Application No. 101151133, filed on Dec. 28, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, etc. has correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

R.O.C. Patent No. M369459 disclosed an optical imaging lens constructed with five lens elements. The distance from an object-side surface of the first lens element to an image plane in the optical imaging lens of the first embodiment thereof is 10.2 mm.

R.O.C. Patent Publication No. 201224571 disclosed an optical imaging lens constructed with five lens elements. The distance from an object-side surface of the first lens element to an image plane in the optical imaging lens thereof is 5.204 mm.

U.S. Patent Publication No. 2010/0253829 disclosed an optical imaging lens constructed with five lens elements. The distance from an object-side surface of the first lens element to an image plane in the optical imaging lens of the first embodiment thereof is 9.6527 mm.

The lengths of the optical imaging lens shown in the above patent documents are too long for modern mobile devices, such as cell phones. Therefore, there is needed to develop optical imaging lens with a shorter length, while also having good optical characters.

SUMMARY

An object of the present invention is to provide a mobile device and an optical imaging lens thereof. With controlling the convex or concave shape, the refracting power of the surfaces of the lens elements, and/or equation between parameters, the length of the optical imaging lens is shortened and meanwhile the good optical characters and system functionality are sustained.

In an exemplary embodiment, an optical imaging lens comprises, sequentially from an object side to an image side along an optical axis, comprises an aperture stop, first, second, third, fourth and fifth lens elements, each of said first, second, third, fourth and fifth lens elements having an object-side surface facing toward the object side and an image-side surface facing toward the image side, wherein: the first lens element has positive refracting power, and the image-side surface thereof comprises a convex portion in a vicinity of the optical axis; the object-side surface of the third lens element comprises a concave portion in a vicinity of a periphery of the third lens element; the fourth lens element has positive refracting power, and the object-side surface thereof is a concave surface; the fifth lens element is constructed by plastic material, and the image-side surface thereof comprises a concave portion in a vicinity of the optical axis; the optical imaging lens as a whole has only the five lens elements having refracting power; and a central thickness of the fifth lens element along the optical axis is CT5, an air gap between the fourth lens element and the fifth lens element along the optical axis is AC45, and CT5 and AC45 satisfy the equation:

$$\frac{CT5}{AC45} \geq 4. \qquad \text{Equation (1)}$$

In another exemplary embodiment, other equation (s), such as those relating to the ratio among parameters could be taken into consideration. For example, CT5 and an air gap between the third lens element and the fourth lens element along the optical axis, AC34, could be controlled to satisfy the equation as follows:

$$\frac{CT5}{AC34} \geq 1.85; \qquad \text{Equation (2)}$$

or
CT5 and the sum of all four air gaps from the first lens element to the fifth lens element along the optical axis, AAG, could be controlled to satisfy the equation as follows:

$$\frac{CT5}{AAG} \geq 0.85; \qquad \text{Equation (3)}$$

or
A central thickness of the fourth lens element along the optical axis CT4, CT5, and AAG could be controlled to satisfy the equation (s) as follows:

$$\frac{CT4+CT5}{AAG} \geq 1.5; \qquad \text{Equation (4)}$$

or $$\frac{CT4+CT5}{AAG} \geq 1.75; \qquad \text{Equation (4')}$$

or
CT5 and an air gap between the first lens element and the second lens element along the optical axis, AC12, could be controlled to satisfy the equation as follows:

$$\frac{CT5}{AC12} \geq 11; \qquad \text{Equation (5)}$$

or

A central thickness of the second lens element along the optical axis CT2 and CT5 could be controlled to satisfy the equation as follows:

$$\frac{CT5}{CT2} \geq 2.75;\qquad\text{Equation (6)}$$

or

CT4, CT5 and AC34 could be controlled to satisfy the equation as follows:

$$\frac{CT4+CT5}{AC34} \geq 6.3;\qquad\text{Equation (7)}$$

or

CT2 and AAG could be controlled to satisfy the equation as follows:

$$\frac{AAG}{CT2} \leq 3;\qquad\text{Equation (8)}$$

or

A central thickness of the third lens element along the optical axis CT3 and CT5 could be controlled to satisfy the equation as follows:

$$\frac{CT5}{CT3} \leq 2.8;\qquad\text{Equation (9)}$$

or

AC12 and AC45 could be controlled to satisfy the equation as follows:

$$\frac{AC45}{AC12} \geq 0.8.\qquad\text{Equation (10)}$$

Aforesaid exemplary embodiments are not limited and could be selectively incorporated in other embodiments described herein.

In some exemplary embodiments, more details about the convex or concave surface structure or the refracting power of the lens element(s) could be incorporated for one specific lens element or broadly for plural lens elements to enhance the control for the system performance and/or resolution. For example, the image-side surface of the fifth lens element could further comprise a convex portion in a vicinity of a periphery of the fifth lens element, or the object-side surface of the second lens element could further comprise a convex portion in a vicinity of the optical axis. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit, and an image sensor. The lens barrel is for positioning the optical imaging lens, the module housing unit is for positioning the lens barrel, and the image sensor is positioned at the image-side of the optical imaging lens.

In some exemplary embodiments, the module housing unit optionally comprises an auto-focusing module comprising a seat element and a lens backseat. The seat element is positioned close to the outside of the lens barrel and along an axis for driving the lens barrel and the optical imaging lens positioned therein to move along the axis. The lens backseat is positioned along the axis and around the outside of the seat element. The module housing unit could optionally further comprise an image sensor base positioned between the lens backseat and the image sensor which is closed to the lens backseat.

Through controlling the convex or concave shape of the surfaces, the refracting power of the lens element(s) and/or equations between parameters, the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of a first embodiment of an optical imaging lens having five lens elements according to the present disclosure;

FIG. 2 is a chart of longitudinal spherical aberration and other kinds of optical aberrations of a first embodiment of the optical imaging lens according to the present disclosure;

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 30 is a table for the values of AAG, $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34}, \frac{AAG}{CT2},$$
$$\frac{CT5}{CT3} \text{ and } \frac{AC45}{AC12}$$

Figure 3:
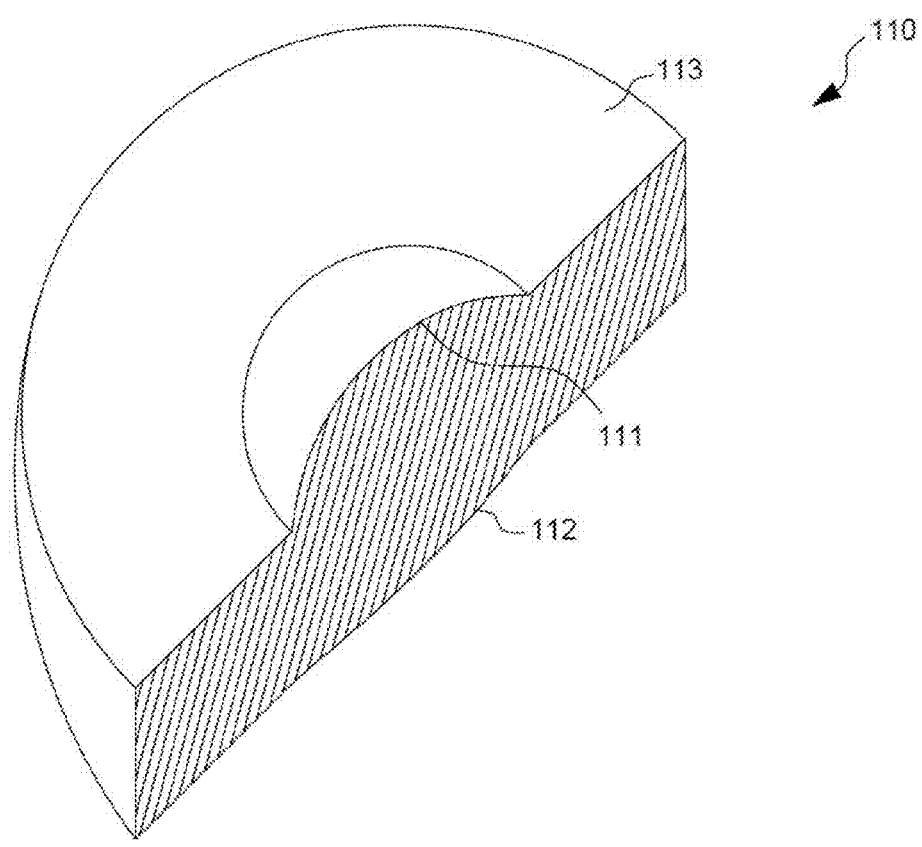
FIG. 3 is a cross-sectional view of a lens element of the optical imaging lens of an example embodiment of the present disclosure.

of all seven example embodiments;

FIG. 31 is a structure of an example embodiment of a mobile device;

FIG. 32 is a partially enlarged view of the structure of another example embodiment of a mobile device.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise an aperture stop, a first lens element, a second lens element, a third lens element, a fourth lens element and a fifth lens element, each of the lens elements has an object-side surface facing toward an object side and an image-side surface facing toward an image side. These lens elements may be arranged sequentially from the object side to the image side along an optical axis, and example embodiments of the lens as a whole may comprise the five lens elements having refracting power. In an example embodiment: the first lens element has positive refracting power, and the image-side surface thereof comprises a convex portion in a vicinity of the optical axis; the object-side surface of the third lens element comprises a concave portion in a vicinity of a periphery of the third lens element; the fourth lens element has positive refracting power, and the object-side surface thereof is a concave surface; the fifth lens element is constructed by plastic material, and the image-side surface thereof comprises a concave portion in a vicinity of the optical axis; the optical imaging lens as a whole has only the five lens elements having refracting power; and a central thickness of the fifth lens element along the optical axis is CT5, an air gap between the fourth lens element and the fifth lens element along the optical axis is AC45, and CT5 and AC45 satisfy the equation:

$$\frac{CT5}{AC45} \geq 4. \qquad \text{Equation (1)}$$

Preferably, the lens elements are designed in light of the optical characteristics and the length of the optical imaging lens. For example, the first lens element having positive refracting power provides the desired light converge ability of the optical imaging lens. The position of the aperture stop and the positive refracting power of the first lens element could effectively shorten the length of the optical imaging lens and depress the angle of the chief ray (the incident angle of the light onto the image sensor) for a better image quality. With a further concave portion in a vicinity of a periphery on the object-side surface of the third lens element and the concave surface of the object-side surface of the fourth lens element, the aberration of the optical lens generated by the first lens element could be eliminated for improving the quality on the peripheral image. The concave portion in a vicinity of the optical axis on the image-side surface of the fifth lens element could assist in compensating the aberration of the optical lens for the peripheral image. Additionally, the value of $$\frac{CT5}{AC45}$$

is preferable to greater than or equal to 4 to satisfy Equation (1) for shortening the length of the optical imaging lens. This is because a relative thick thickness of the fifth lens element is required by the greater area for passing light but the air gap between the fourth and fifth lens elements is shortened. Preferably, $$4 \le \frac{CT5}{AC45} \le 18.5.$$

All these details could promote the image quality of the whole system.

In another exemplary embodiment, other equation (s) of parameters, such as a central thickness of a lens element along the optical axis and an air gap between any two adjacent lens elements, could be taken into consideration. For example, CT5 and an air gap between the third lens element and the fourth lens element along the optical axis, AC34, could be controlled to satisfy the equation as follows:

$$\frac{CT5}{AC34} \ge 1.85; \qquad \text{Equation (2)}$$

or

CT5 and the sum of all four air gaps from the first lens element to the fifth lens element along the optical axis, AAG, could be controlled to satisfy the equation as follows:

$$\frac{CT5}{AAG} \ge 0.85; \qquad \text{Equation (3)}$$

or

A central thickness of the fourth lens element along the optical axis CT4, CT5, and AAG could be controlled to satisfy the equation (s) as follows:

$$\frac{CT4 + CT5}{AAG} \ge 1.5; \qquad \text{Equation (4)}$$

or $$\frac{CT4 + CT5}{AAG} \ge 1.75; \qquad \text{Equation (4')}$$

or

CT5 and an air gap between the first lens element and the second lens element along the optical axis, AC12, could be controlled to satisfy the equation as follows:

$$\frac{CT5}{AC12} \ge 11; \qquad \text{Equation (5)}$$

or

A central thickness of the second lens element along the optical axis CT2 and CT5 could be controlled to satisfy the equation as follows:

$$\frac{CT5}{CT2} \ge 2.75; \qquad \text{Equation (6)}$$

or

CT4, CT5 and AC34 could be controlled to satisfy the equation as follows:

$$\frac{CT4 + CT5}{AC34} \ge 6.3; \qquad \text{Equation (7)}$$

or

CT2 and AAG could be controlled to satisfy the equation as follows:

$$\frac{AAG}{CT2} \le 3; \qquad \text{Equation (8)}$$

or

A central thickness of the third lens element along the optical axis, CT3 and CT5 could be controlled to satisfy the equation as follows:

$$\frac{CT5}{CT3} \le 2.8; \qquad \text{Equation (9)}$$

or

AC12 and AC45 could be controlled to satisfy the equation as follows:

$$\frac{AC45}{AC12} \ge 0.8. \qquad \text{Equation (10)}$$

Aforesaid exemplary embodiments are not limited and could be selectively incorporated in other embodiments described herein.

Reference is now made to Equation (2). The reason for designing this equation is that the diameter for passing light in the fifth lens element is greater. Therefore, for facilitating production, the thickness thereof could not be too thin. When Equation (2) is satisfied, the values of CT5 and AC34 are proper for shortening the length of the optical imaging lens. Additionally, $$1.85 \le \frac{CT5}{AC34} \le 6.5$$

could be further satisfied.

Reference is now made to Equation (3). The reason for designing this equation is that the diameter for passing light in the fifth lens element is greater. Therefore, for facilitating production, the thickness thereof could not be too thin. When Equation (3) is satisfied, the values of AAG and CT5 are proper for shortening the length of the optical imaging lens. Additionally, $$0.85 \le \frac{CT5}{AAG} \le 1.55$$

could be further satisfied.

Reference is now made to Equation (4)/(4'). The reason for designing this equation is that the sum of all air gaps is required for shortened, but the shortening for the thickness of the fourth and fifth lens elements is limited by the positive refracting power of the fourth lens element and the greater diameter of the fifth lens element for passing light. When Equation (4) is satisfied, the values of CT4, CT5 and AAG are proper for shortening the length of the optical imaging lens and when Equation (4') is satisfied the AAG could be more shortened. Additionally, $$1.5 \le \frac{CT4 + CT5}{AAG} \le 3.5$$

could be further satisfied.

Reference is now made to Equation (5). The reason for designing this equation is that the diameter for passing light in the fifth lens element is greater. Therefore, for facilitating production, the thickness thereof could not be too thin. However, the air gap AC12 is required to be shortened. When Equation (5) is satisfied, the values of CT5 and AC12 are proper for shortening the length of the optical imaging lens. Additionally, $$11 \le \frac{CT5}{AC12} \le 18.5$$

could be further satisfied.

Reference is now made to Equation (6). The reason for designing this equation is that the diameter for passing light in the fifth lens element is greater. Therefore, the thickness of the fifth lens element may be greater than that of the second lens element. When Equation (6) is satisfied, the values of CT2 and CT5 are proper for shortening the length of the optical imaging lens. Additionally, $$2.75 \le \frac{CT5}{CT2} \le 3.95$$

could be further satisfied.

Reference is now made to Equation (7). The reason for designing this equation is that the diameter for passing light both in the fourth and fifth lens elements is greater. Therefore, for facilitating production, the thickness thereof could not be too thin. When Equation (7) is satisfied, the values of CT4, CT5 and AC34 are proper for shortening the length of the optical imaging lens. Additionally, $$6.3 \le \frac{CT4 + CT5}{AC34} \le 14$$

could be further satisfied.

Reference is now made to Equation (8). The reason for designing this equation is that the sum of all air gap AAG is shortened more than CT2 is. When Equation (8) is satisfied, the values of CT2 and AAG are proper for shortening the length of the optical imaging lens. Additionally, $$2.2 \le \frac{AAG}{CT2} \le 3$$

could be further satisfied.

Reference is now made to Equation (9). The reason for designing this equation is that the diameter for passing light in the fifth lens element is greater. Therefore, the thickness of the fifth lens element could be thicker than that of the third lens element. When Equation (9) is satisfied, the values of CT3 and CT5 are proper for shortening the length of the optical imaging lens. Additionally, $$1.65 \le \frac{CT5}{CT3} \le 2.8$$

could be further satisfied.

Reference is now made to Equation (10). The reason for designing this equation is that AC12, which is between the convex portion in a vicinity of the optical axis formed on the image-side surface of the first lens element and an optional convex portion in a vicinity of the optical axis formed on the object-side surface of the second lens element, is shortened more than AC45 is due to the similar diameter for passing light of the first and second lens element. When Equation (10) is satisfied, the values of AC12 and AC45 are proper for shortening the length of the optical imaging lens. Additionally, $$0.8 \le \frac{AC45}{AC12} \le 3.5$$

could be further satisfied.

When implementing example embodiments, more details about the convex or concave surface structure and/or the refracting power may be incorporated for one specific lens element or broadly for plural lens elements to enhance the control for the system performance and/or resolution, as illustrated in the following embodiments. For example, the image-side surface of the fifth lens element could further comprise a convex portion in a vicinity of a periphery of the fifth lens element, or the object-side surface of the second lens element could further comprise a convex portion in a vicinity of the optical axis. It is noted that the details listed here could be incorporated in example embodiments if no inconsistency occurs.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens 1 having five lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2 along an optical axis, an aperture stop 100 positioned before a first lens element 110, the first lens element 110, a second lens element 120, a third lens element 130, a fourth lens element 140, a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 has an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens element of the optical imaging lens 1 will now be described with reference to the drawings.

An example embodiment of the first lens element 110 may have positive refracting power, which may be constructed by plastic material. The object-side surface 111 is a convex surface and the image-side surface 112 has a convex portion 1121 in a vicinity of the optical axis and a convex portion 1122 in a vicinity of a periphery of the first lens element 110.

An example embodiment of the second lens element 120 may have negative refracting power, which may be constructed by plastic material. The object-side surface 121 is a convex surface and the image-side surface 122 is a concave surface.

An example embodiment of the third lens element 130 may have negative refracting power, which may be constructed by plastic material. The object-side surface 131 has a convex portion 1311 in a vicinity of the optical axis and a concave portion 1312 in a vicinity of a periphery of the third lens element 130, and the image-side surface 132 has a concave portion 1321 in a vicinity of the optical axis, a concave portion 1322 in a vicinity of a periphery of the third lens element 130 and a convex portion 1323 between the vicinity of the optical axis and the vicinity of the periphery of the third lens element 130.

An example embodiment of the fourth lens element 140 may have positive refracting power, which may be constructed by plastic material. The object-side surface 141 is a concave surface, and the image-side surface 142 is a convex surface.

An example embodiment of the fifth lens element 150 may have negative refracting power, which may be constructed by plastic material. The object-side surface 151 has a convex portion 1511 in a vicinity of the optical axis and a concave portion 1512 in a vicinity of a periphery of the fifth lens element 150. The image-side surface 152 has a concave portion 1521 in a vicinity of the optical axis and a convex portion 1522 in a vicinity of a periphery of the fifth lens element 150.

In example embodiments, air gaps exist between the lens elements 110, 120, 130, 140, 150, the filtering unit 160, and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by AC12, the air gap d3 is denoted by AC34, and the sum of all air gaps d1, d2, d3, d4 between the first and fifth lens elements 110, 150 is denoted by AAG.

FIG. 4 depicts the optical characters of each lens elements in the optical imaging lens 1 of the present embodiment, wherein the values of $$\frac{CT5}{AC45}, \frac{CT5}{AC34}, \frac{CT5}{AAG}, \frac{CT4+CT5}{AAG},$$

$$\frac{CT5}{AC12}, \frac{CT5}{CT2}, \frac{CT4+CT5}{AC34}, \frac{AAG}{CT2}, \frac{CT5}{CT3} \text{ and } \frac{AC45}{AC12}$$

are:

$$\frac{CT5}{AC45} = 18.000,$$

satisfying equation (1);

$$\frac{CT5}{AC34} = 6.000,$$

satisfying equation (2);

$$\frac{CT5}{AAG} = 1.470,$$

satisfying equation (3);

$$\frac{CT4+CT5}{AAG} = 2.593,$$

satisfying equation (4), (4');

$$\frac{CT5}{AC12} = 18.115,$$

satisfying equation (5);

$$\frac{CT5}{CT2} = 3.819,$$

satisfying equation (6);

$$\frac{CT4+CT5}{AC34}=10.586,$$

satisfying equation (7);

$$\frac{AAG}{CT2}=2.598,$$

satisfying equation (8);

$$\frac{CT5}{CT3}=2.088,$$

satisfying equation (9);

$$\frac{AC45}{AC12}=1.006,$$

satisfying equation (10);

wherein the distance from the object-side surface 111 of the first lens element 110 to the image plane 170 along the optical axis is 4.858 (mm), and the length of the optical imaging lens 1 is shortened.

Please note that, in example embodiments, to clearly illustrate the structure of each lens element, only the part where light passes is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side convex surface 111 and the image-side surface 112 for mounting the first lens element 110 in the optical imaging lens 1, and ideally, light will not pass through the protruding part 113.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, and the object-side surface 151 and the image-side surface 152 of the fifth lens element 150 are all defined by the following aspherical formula:

$$Z(Y)=\frac{Y^2}{R}\bigg/\left(1+\sqrt{1-(1+K)\frac{Y^2}{R^2}}\right)+\sum_{i=1}^{n}a_{2i}\times Y^{2i}$$

wherein,

R represents the radius of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents a aspherical coefficient of $2i^{th}$ level.

The values of each aspherical parameter are shown in FIG. 5.

As illustrated in FIG. 2, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.02 (mm). Therefore, the present embodiment improves the longitudinal spherical aberration with respect to different wavelengths.

Please refer to FIG. 2, astigmatism aberration in the sagittal direction (b) and astigmatism aberration in the tangential direction (c). The focus variation with respect to the three wavelengths in the whole field falls within ±0.02 (mm). This reflects the optical imaging lens 1 of the present embodiment eliminates aberration effectively.

Please refer to FIG. 2, distortion aberration (d), which showing the variation of the distortion aberration is within ±5%. Such distortion aberration meets the requirement of acceptable image quality and shows the optical imaging lens 1 of the present embodiment could restrict the distortion aberration to raise the image quality even though the length of the optical imaging lens 1 is shortened to 4.858 mm.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
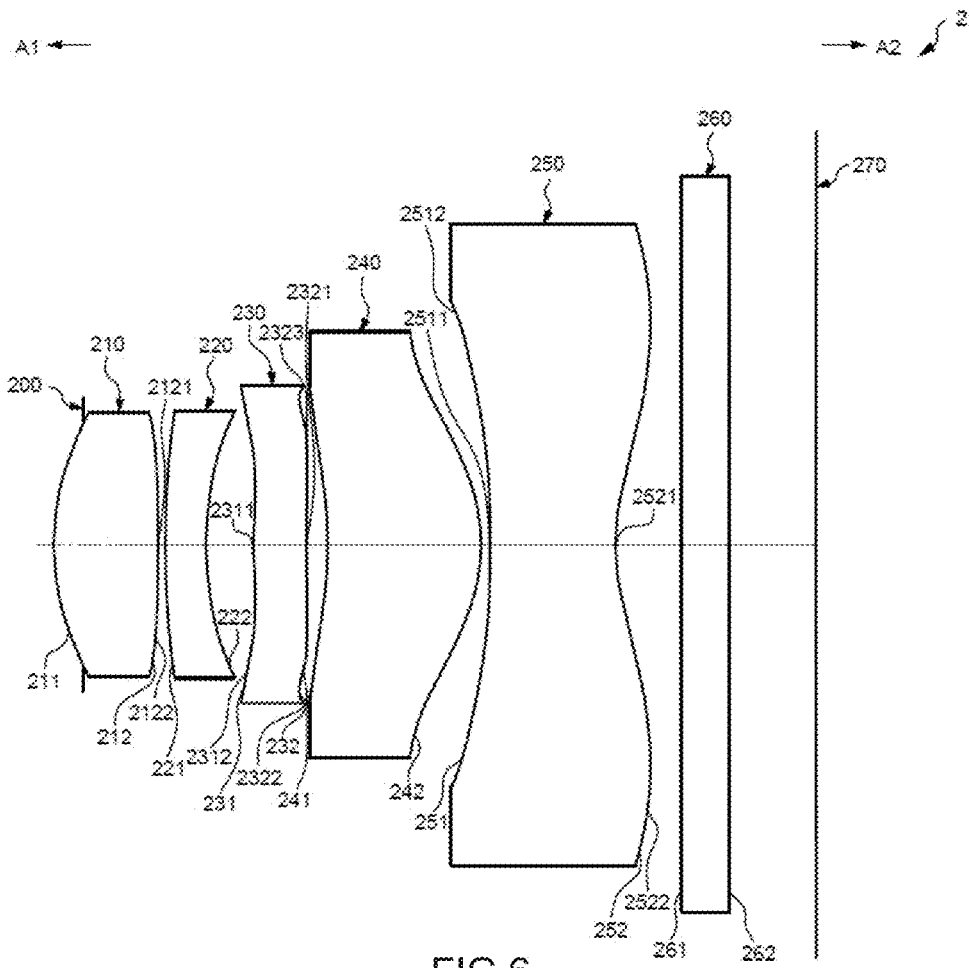
FIG. 6 is a cross-sectional view of a second embodiment of an optical imaging lens having five lens elements according to the present disclosure.
Figure 7:
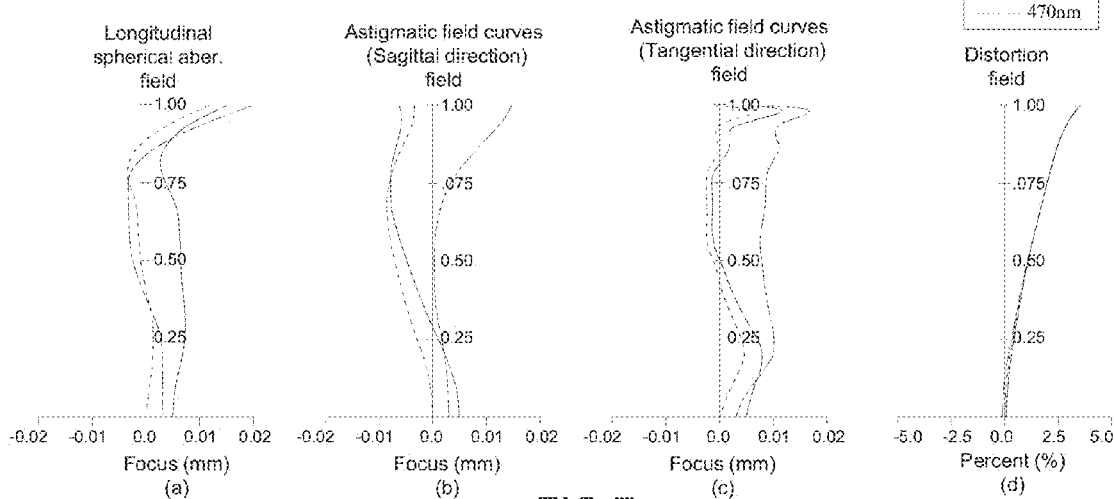
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises an aperture stop 200, the first lens element 210, a second lens element 220, a third lens element 230, a fourth lens element 240 and a fifth lens element 250.

The differences between the second embodiment and the first embodiment are the radius and thickness of each lens element, the distance of each air gap and the positive refracting power of the third lens element 230. The refracting power of other lens elements and configuration of the concave/convex shape on the object-side or image-side surfaces of the lens elements are similar to those in the first embodiment. Please refer to FIG. 8 for the optical characteristics of each lens elements in the optical imaging lens 2 of the present embodiment, wherein the values of $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34},$$

$$\frac{AAG}{CT2}, \frac{CT5}{CT3} \text{ and } \frac{AC45}{AC12}$$

are:

$$\frac{CT5}{AC45} = 16.326,$$

satisfying equation (1);

$$\frac{CT5}{AC34} = 6.000,$$

satisfying equation (2);

$$\frac{CT5}{AAG} = 1.480,$$

satisfying equation (3);

$$\frac{CT4+CT5}{AAG} = 3.300,$$

satisfying equation (4), (4');

$$\frac{CT5}{AC12} = 16.326,$$

satisfying equation (5);

$$\frac{CT5}{CT2} = 3.154,$$

satisfying equation (6);

$$\frac{CT4+CT5}{AC34} = 13.377,$$

satisfying equation (7);

$$\frac{AAG}{CT2} = 2.131,$$

satisfying equation (8);

$$\frac{CT5}{CT3} = 2.417,$$

satisfying equation (9);

$$\frac{AC45}{AC12} = 1.000,$$

satisfying equation (10);

wherein the distance from the object-side surface 211 of the first lens element 210 to the image plane 270 along the optical axis is 4.948 (mm) and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
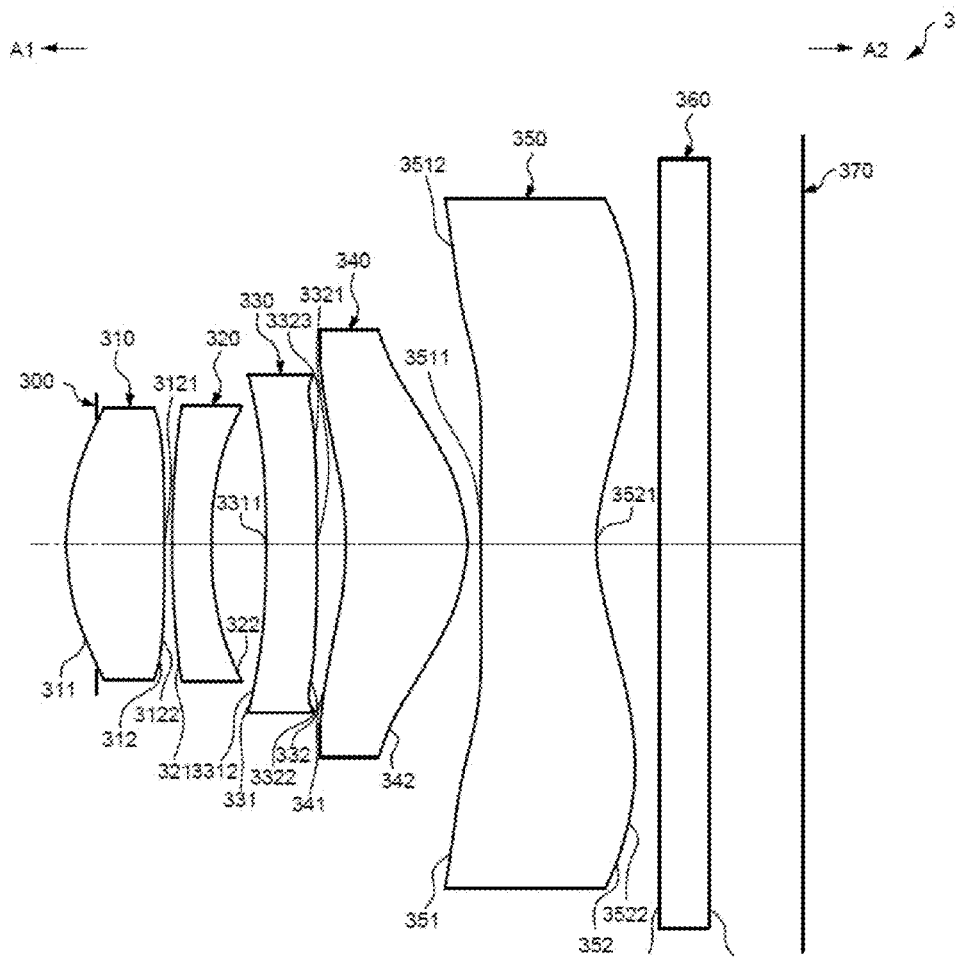
FIG. 10 is a cross-sectional view of a third embodiment of an optical imaging lens having five lens elements according to the present disclosure.
Figure 11:
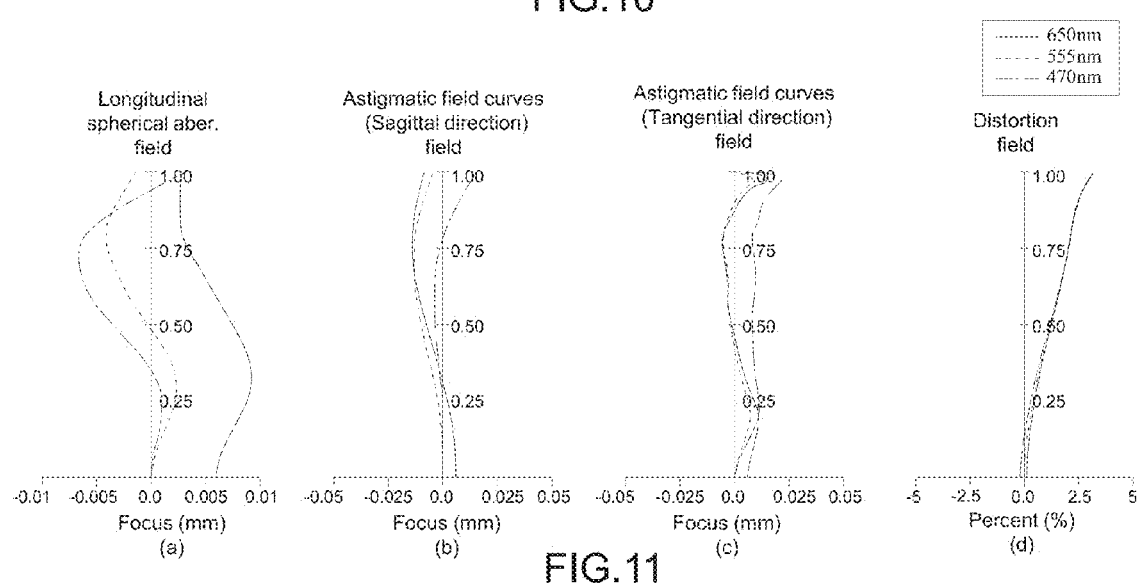
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises an aperture stop 300, the first lens element 310, a second lens element 320, a third lens element 330, a fourth lens element 340 and a fifth lens element 350.

The differences between the third embodiment and the first embodiment are the radius and thickness of each lens element and the distance of each air gap. The refracting power and configuration of the concave/convex shape on the object-side or image-side surfaces of the lens elements are similar to those in the first embodiment. Please refer to FIG. 12 for the optical characteristics of each lens elements in the optical imaging lens 3 of the present embodiment, wherein the values of $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34},$$

$$\frac{AAG}{CT2}, \frac{CT5}{CT3} \text{ and } \frac{AC45}{AC12}$$

are:

$$\frac{CT5}{AC45} = 9.000,$$

satisfying equation (1);

$$\frac{CT5}{AC34} = 3.977,$$

satisfying equation (2);

$$\frac{CT5}{AAG} = 1.100,$$

satisfying equation (3);

$$\frac{CT4+CT5}{AAG} = 2.251,$$

satisfying equation (4), (4');

$$\frac{CT5}{AC12} = 14.723,$$

satisfying equation (5);

$$\frac{CT5}{CT2} = 2.986,$$

satisfying equation (6);

$$\frac{CT4+CT5}{AC34} = 8.139,$$

satisfying equation (7);

$$\frac{AAG}{CT2} = 2.714,$$

satisfying equation (8);

$$\frac{CT5}{CT3} = 2.302,$$

satisfying equation (9);

$$\frac{AC45}{AC12} = 1.636,$$

satisfying equation (10);

wherein the distance from the object-side surface 311 of the first lens element 310 to the image plane 370 along the optical axis is 4.664 (mm) and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
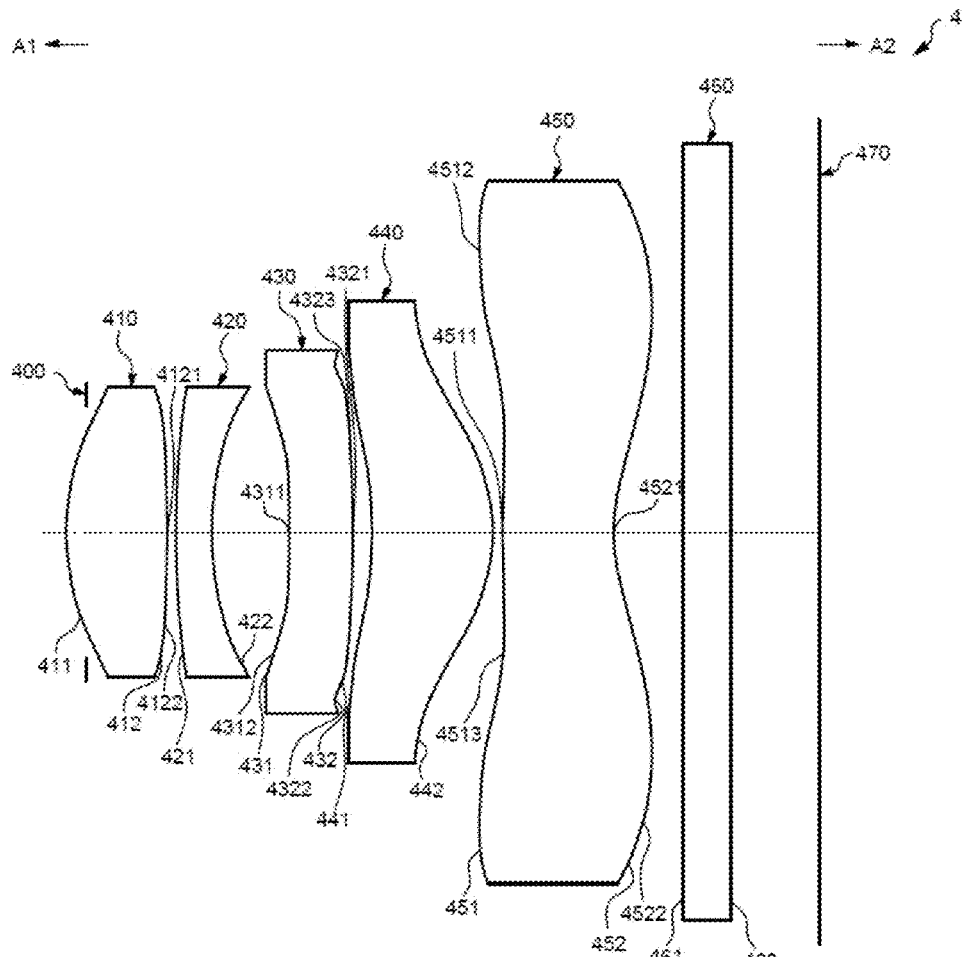
FIG. 14 is a cross-sectional view of a fourth embodiment of an optical imaging lens having five lens elements according to the present disclosure.
Figure 15:
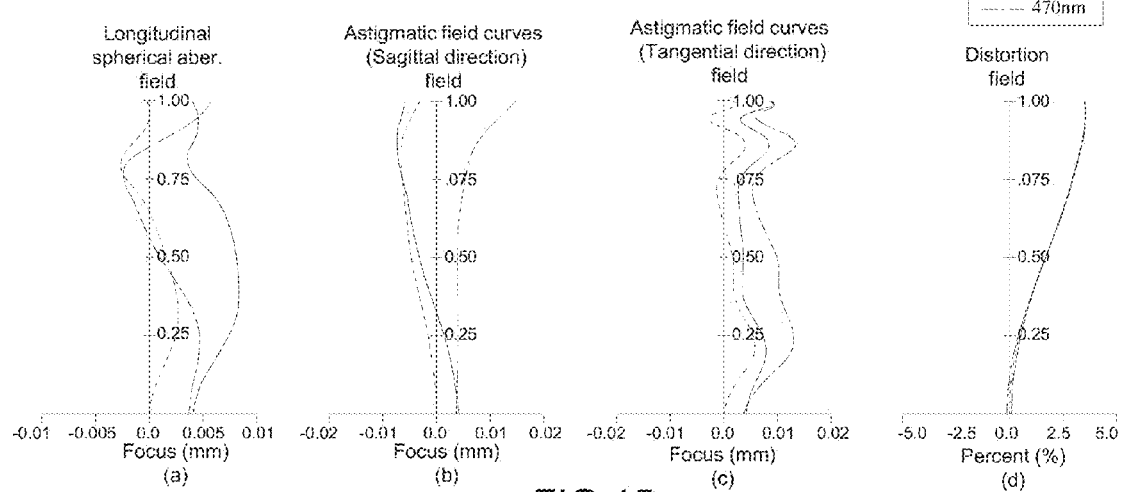
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises an aperture stop 400, the first lens element 410, a second lens element 420, a third lens element 430, a fourth lens element 440 and a fifth lens element 450.

The differences between the fourth embodiment and the first embodiment are the radius and thickness of each lens element, the distance of each air gap and configuration of the concave/convex shape on the object-side surfaces 431 and 451 of the third and fifth lens elements 430 and 450. Specifically, here the object-side surface 431 of the third lens element 430 has a concave portion 4311 in a vicinity of the optical axis and the object-side surface 451 of the fifth lens element 450 has a convex portion 4511 in a vicinity of the optical axis, a convex portion 4512 in a vicinity of a periphery of the fifth lens element 450 and a concave portion 4513 between the vicinity of the optical axis and the vicinity of the periphery of the fifth lens element 450. The refracting power of the lens elements and configuration of the concave/convex shape on other object-side or image-side surfaces of the lens elements are similar to those in the first embodiment. Please refer to FIG. 16 for the optical characteristics of each lens elements in the optical imaging lens 4 of the present embodiment, wherein the values of $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34},$$

$$\frac{AAG}{CT2}, \frac{CT5}{CT3} \text{ and } \frac{AC45}{AC12}$$

are:

$$\frac{CT5}{AC45} = 12.239,$$

satisfying equation (1);

$$\frac{CT5}{AC34} = 5.950,$$

satisfying equation (2);

$$\frac{CT5}{AAG} = 0.981,$$

satisfying equation (3);

$$\frac{CT4 + CT5}{AAG} = 2.053,$$

satisfying equation (4), (4');

$$\frac{CT5}{AC12} = 14.077,$$

satisfying equation (5);

$$\frac{CT5}{CT2} = 3.039,$$

satisfying equation (6);

$$\frac{CT4 + CT5}{AC34} = 12.453,$$

satisfying equation (7);

$$\frac{AAG}{CT2} = 3.098;$$

$$\frac{CT5}{CT3} = 1.726,$$

satisfying equation (9);

$$\frac{AC45}{AC12} = 1.150,$$

satisfying equation (10);

wherein the distance from the object-side surface 411 of the first lens element 410 to the image plane 470 along the optical axis is 4.774 (mm) and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
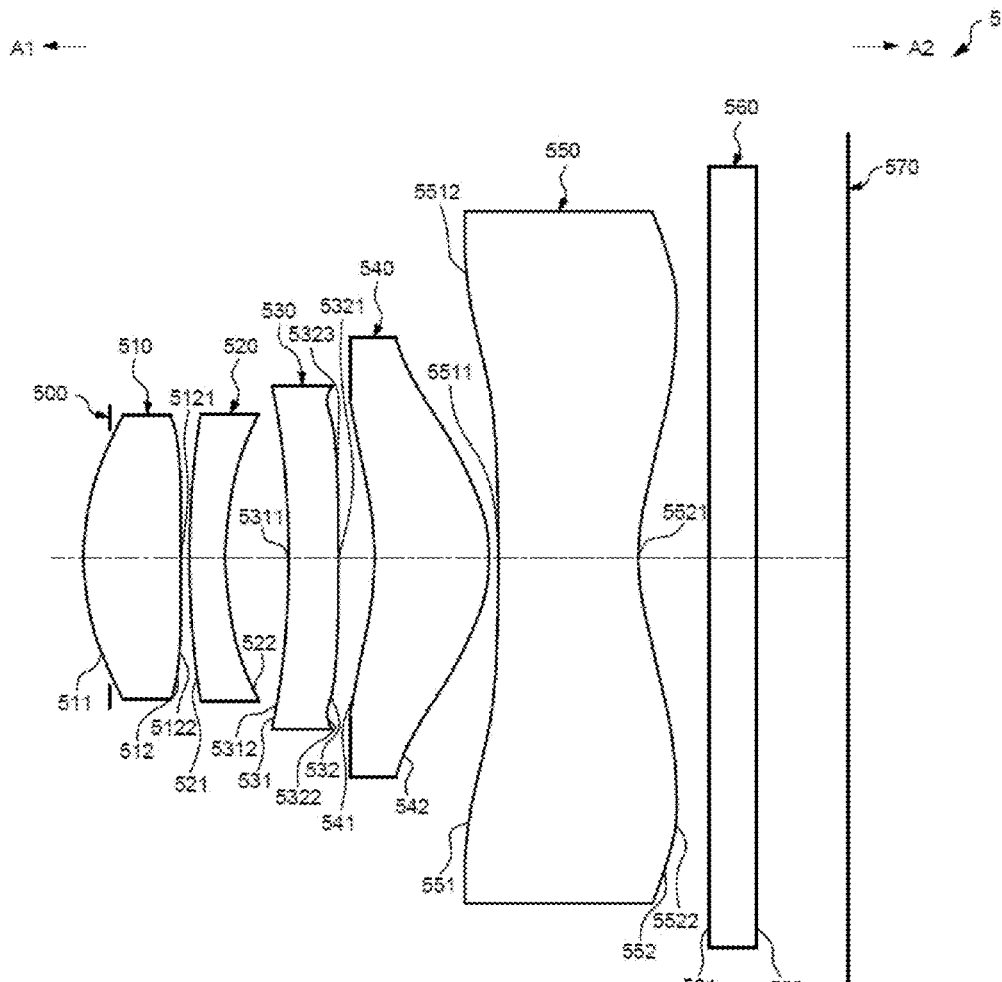
FIG. 18 is a cross-sectional view of a fifth embodiment of an optical imaging lens having five lens elements according to the present disclosure.
Figure 19:
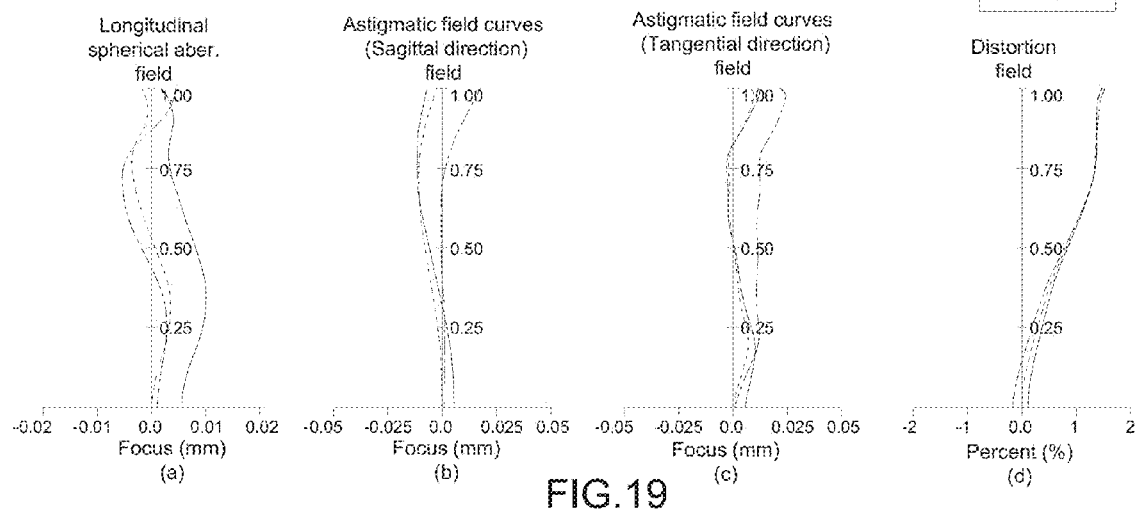
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises an aperture stop 500, the first lens element 510, a second lens element 520, a third lens element 530, a fourth lens element 540 and a fifth lens element 550.

The differences between the fifth embodiment and the first embodiment are the radius and thickness of each lens element, the distance of each air gap and the positive refracting power of the third lens element 530. The refracting power of other lens elements and the configuration of the concave-convex shape on the object-side or image-side surfaces of the lens elements are similar to those in the first embodiment. Please refer to FIG. 20 for the optical characteristics of each lens elements in the optical imaging lens 5 of the present embodiment, wherein the values of $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34},$$

$$\frac{AAG}{CT2}, \frac{CT5}{CT3} \text{ and } \frac{AC45}{AC12}$$

are:

$$\frac{CT5}{AC45} = 17.500,$$

satisfying equation (1);

$$\frac{CT5}{AC34} = 3.886,$$

satisfying equation (2);

$$\frac{CT5}{AAG} = 1.218,$$

satisfying equation (3);

$$\frac{CT4 + CT5}{AAG} = 2.222,$$

satisfying equation (4), (4');

$$\frac{CT5}{AC12} = 17.500,$$

satisfying equation (5);

$$\frac{CT5}{CT2} = 3.890,$$

satisfying equation (6);

$$\frac{CT4 + CT5}{AC34} = 7.085,$$

satisfying equation (7);

$$\frac{AAG}{CT2} = 3.193;$$

$$\frac{CT5}{CT3} = 2.795,$$

satisfying equation (9);

$$\frac{AC45}{AC12} = 1.000,$$

satisfying equation (10);

wherein the distance from the object-side surface 511 of the first lens element 510 to the image plane 570 along the optical axis is 4.762 (mm) and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
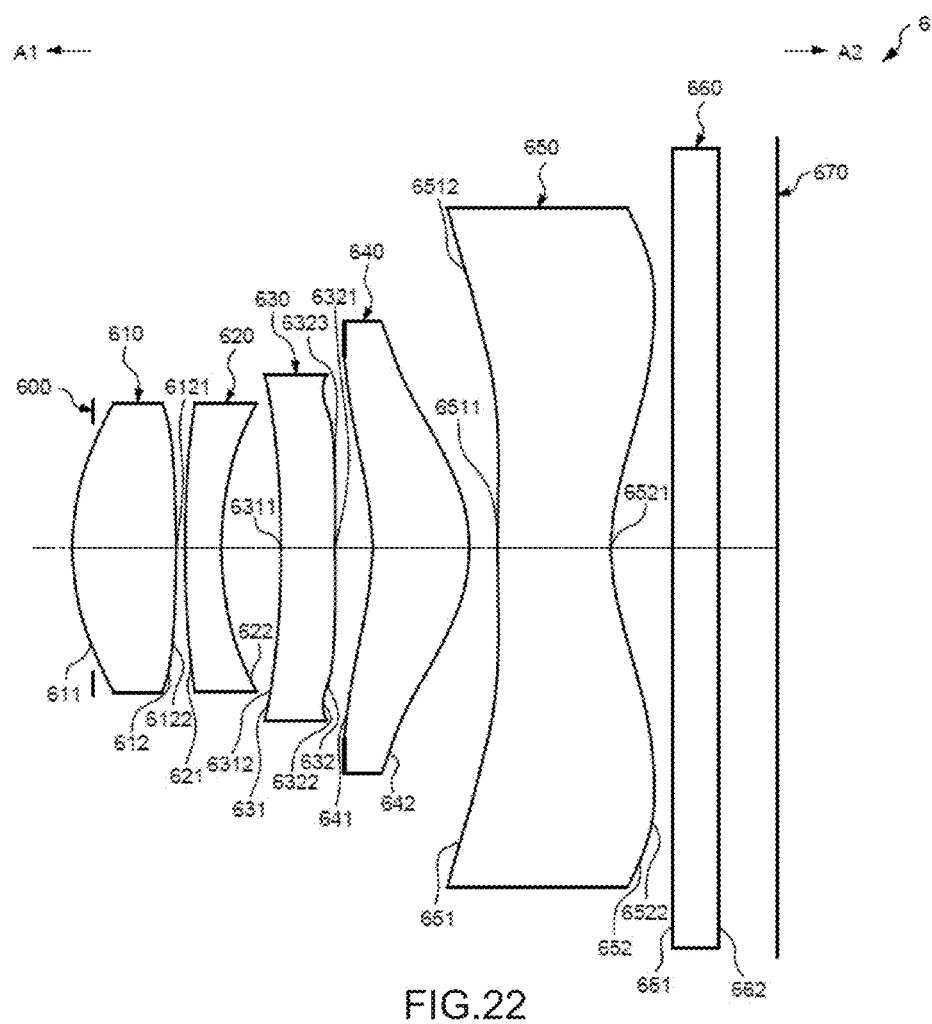
FIG. 22 is a cross-sectional view of a sixth embodiment of an optical imaging lens having five lens elements according to the present disclosure.
Figure 23:
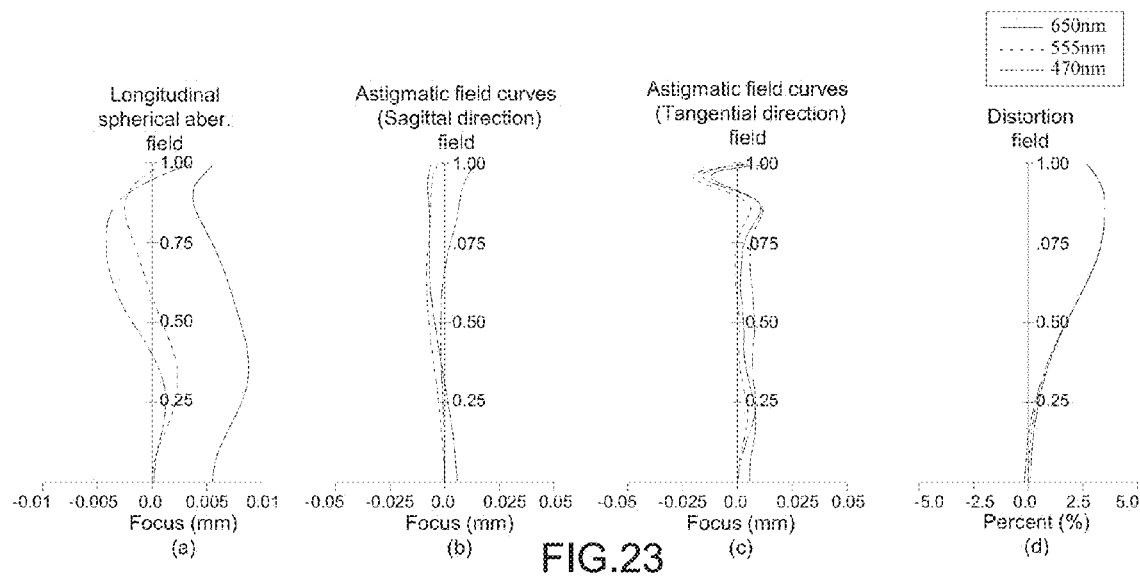
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises an aperture stop 600, the first lens element 610, a second lens element 620, a third lens element 630, a fourth lens element 640 and a fifth lens element 650.

The differences between the sixth embodiment and the first embodiment are the radius and thickness of each lens element, the distance of each air gap and the positive refracting power of the third lens element 630. The refracting power of other lens elements and the configuration of the concave-convex shape on the object-side or image-side surfaces of the lens elements are similar to those in the first embodiment. Please refer to FIG. 24 for the optical characteristics of each lens elements in the optical imaging lens 6 of the present embodiment, wherein the values of $$\frac{CT5}{AC45}, \frac{CT5}{AC34}, \frac{CT5}{AAG}, \frac{CT4+CT5}{AAG}, \frac{CT5}{AC12}, \frac{CT5}{CT2}, \frac{CT4+CT5}{AC34},$$

$$\frac{AAG}{CT2}, \frac{CT5}{CT3} \text{ and } \frac{AC45}{AC12}$$

are:

$$\frac{CT5}{AC45} = 4.100,$$

satisfying equation (1);

$$\frac{CT5}{AC34} = 3.086,$$

satisfying equation (2);

$$\frac{CT5}{AAG} = 0.852,$$

satisfying equation (3);

$$\frac{CT4 + CT5}{AAG} = 1.585,$$

satisfying equation (4);

$$\frac{CT5}{AC12} = 13.880,$$

satisfying equation (5);

$$\frac{CT5}{CT2} = 3.112,$$

satisfying equation (6);

$$\frac{CT4+CT5}{AC34} = 5.741;$$

$$\frac{AAG}{CT2} = 3.653;$$

$$\frac{CT5}{CT3} = 2.118,$$

satisfying equation (9);

$$\frac{AC45}{AC12} = 3.385,$$

satisfying equation (10);

wherein the distance from the object-side surface 611 of the first lens element 610 to the image plane 670 along the optical axis is 4.521 (mm) and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
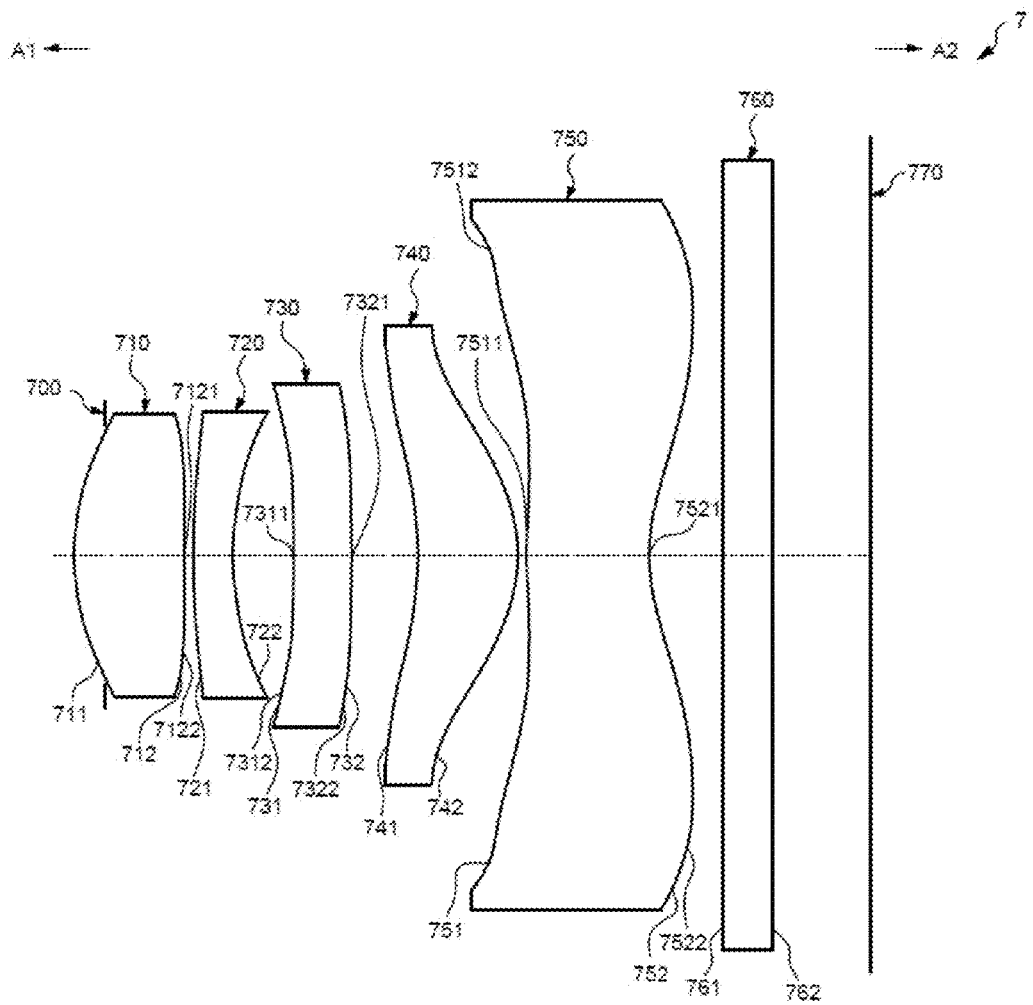
FIG. 26 is a cross-sectional view of a seventh embodiment of an optical imaging lens having five lens elements according to the present disclosure.
Figure 27:
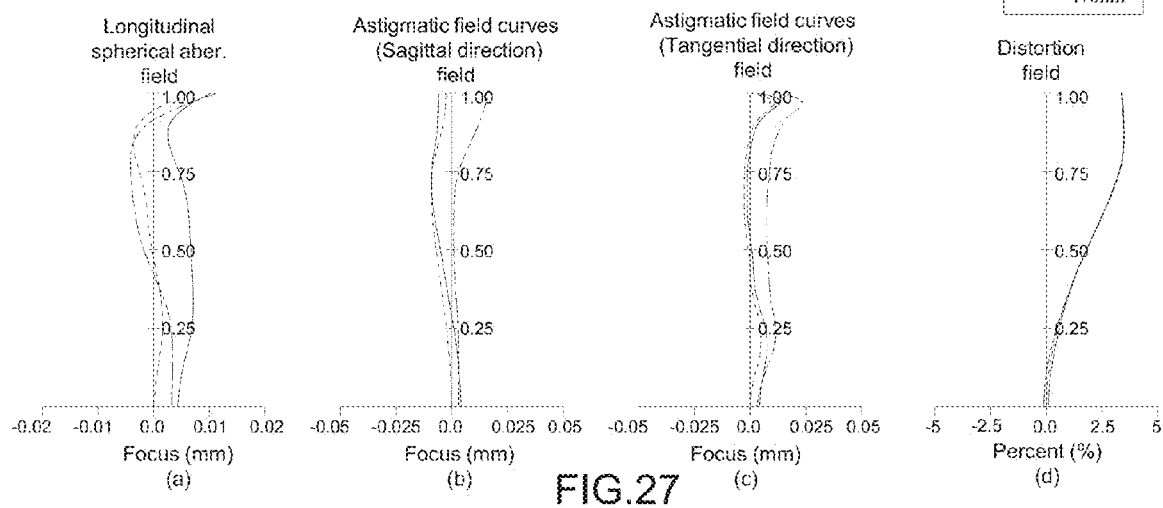
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises an aperture stop 700, the first lens element 710, a second lens element 720, a third lens element 730, a fourth lens element 740 and a fifth lens element 750.

The differences between the seventh embodiment and the first embodiment are the radius and thickness of each lens element, the distance of each air gap and the positive refracting power of the third lens element 730 and image-side surface 732 of the third lens element 730 has a convex portion 7322 in a vicinity of a periphery of the third lens element 730. The refracting power of other lens elements and the configuration of the concave-convex shape on the object-side or image-side surfaces of the lens elements are similar to those in the first embodiment. Please refer to FIG. 28 for the optical characteristics of each lens elements in the optical imaging lens 7 of the present embodiment, wherein the values of $$\frac{CT5}{AC45}, \frac{CT5}{AC34}, \frac{CT5}{AAG}, \frac{CT4+CT5}{AAG}, \frac{CT5}{AC12},$$

$$\frac{CT5}{CT2}, \frac{CT4+CT5}{AC34}, \frac{AAG}{CT2}, \frac{CT5}{CT3} \text{ and } \frac{AC45}{AC12}$$

are:

$$\frac{CT5}{AC45} = 14.444,$$

satisfying equation (1);

$$\frac{CT5}{AC34} = 1.855,$$

satisfying equation (2);

$$\frac{CT5}{AAG} = 0.851,$$

satisfying equation (3);

$$\frac{CT4+CT5}{AAG} = 1.550,$$

satisfying equation (4);

$$\frac{CT5}{AC12} = 14.444,$$

satisfying equation (5);

$$\frac{CT5}{CT2} = 3.066,$$

satisfying equation (6);

$$\frac{CT4+CT5}{AC34} = 3.379;$$

$$\frac{AAG}{CT2} = 3.603;$$

$$\frac{CT5}{CT3} = 2.102,$$

satisfying equation (9);

$$\frac{AC45}{AC12} = 1.000,$$

satisfying equation (10);

wherein the distance from the object-side surface 711 of the first lens element 710 to the image plane 770 along the optical axis is 4.700 (mm) and the length of the optical imaging lens 7 is shortened.

As shown in FIG. 23, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Please refer to FIG. 30, which shows the values of $$\frac{CT5}{AC45}, \frac{CT5}{AC34}, \frac{CT5}{AAG},$$

$$\frac{CT4+CT5}{AAG}, \frac{CT5}{AC12}, \frac{CT5}{CT2}, \frac{CT4+CT5}{AC34}, \frac{AAG}{CT2}, \frac{CT5}{CT3} \text{ and } \frac{AC45}{AC12}$$

of all seven embodiments, and it is clear that the optical imaging lens of the present invention satisfy the Equations (1), (2), (3), (4)/(4'), (5), (6), (7), (8), (9) and/or (10).

Reference is now made to FIG. 31, which illustrates an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 31, the photography module 22 may comprise an aforesaid optical imaging lens with five lens elements, for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a seat element 2401 for positioning the lens barrel 23 and a lens backseat 2406. The lens barrel 23 and the seat element 2401 are positioned along a same axis I-I', and the seat element 2401 is close to the outside of the lens barrel 23. The seat element could drive the lens barrel and the optical imaging lens 1 therein to move along the axis I-I' for focusing.

Because the length of the optical imaging lens 1 is merely 4.858 (mm), the size of the mobile device 20 may be quite small. Therefore, the embodiments described herein meet the market demand for smaller sized product designs.

Reference is now made to FIG. 32, which shows another structural view of a second embodiment of mobile device 20' applying the aforesaid optical imaging lens 1. One difference between the mobile device 20' and the mobile device 20 may be the seat element 2401 comprises a first seat unit 2402, a second seat unit 2403, a coil 2404, and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.858 (mm), is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the ratio of the sum of the central thicknesses of all lens elements to an air gap along the optical axis between the first and second lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising an aperture stop, first, second, third, fourth and fifth lens elements, each of said first, second, third, fourth and fifth lens elements having an object-side surface facing toward the object side and an image-side surface facing toward the image side, wherein:

said first lens element has positive refracting power, and said image-side surface thereof comprises a convex portion in a vicinity of the optical axis;
said object-side surface of said third lens element comprises a concave portion in a vicinity of a periphery of the third lens element;
said fourth lens element has positive refracting power, and said object-side surface thereof is a concave surface;
said fifth lens element is constructed by plastic material, and said image-side surface thereof comprises a concave portion in a vicinity of the optical axis;
the optical imaging lens as a whole has only the five lens elements having refracting power;
a central thickness of the fifth lens element along the optical axis is CT5, an air gap between the fourth lens element and the fifth lens element along the optical axis is AC45, and CT5 and AC45 satisfy the equation:

18.5≥CT5/AC45≥4; and wherein an air gap between the first lens element and the second lens element along the optical axis is AC12, and CT5 and AC12 satisfy the equation:

$$18.5 \ge \frac{CT5}{AC12} \ge 11;$$

wherein the sum of all four air gaps from the first lens element to the fifth lens element along the optical axis is AAG, and CT5 and AAG satisfy the equation:

$$1.55 \ge \frac{CT5}{AAG} \ge 0.85; \text{ and}$$

wherein a central thickness of the third lens element along the optical axis is CT3, and CT3 and CT5 satisfy the equation:

$$1.65 \le \frac{CT5}{CT3} \le 2.8.$$

2. The optical imaging lens according to claim 1, wherein an air gap between the third lens element and the fourth lens element along the optical axis is AC34, and CT5 and AC34 satisfy the equation:

$$6.5 \ge \frac{CT5}{AC34} \ge 1.85.$$

3. The optical imaging lens according to claim 2, wherein a central thickness of the second lens element along the optical axis is CT2, and CT2 and CT5 satisfy the equation:

$$3.95 \ge \frac{CT5}{CT2} \ge 2.75.$$

4. The optical imaging lens according to claim 2, wherein said object-side surface of said second lens element further comprises a convex portion in a vicinity of the optical axis.

5. The optical imaging lens according to claim 4, wherein a central thickness of the fourth lens element along the optical axis is CT4, the sum of all four air gaps from the first lens element to the fifth lens element along the optical axis is AAG, and CT4 and AAG satisfy the equation:

$$3.5 \ge \frac{CT4+CT5}{AAG} \ge 1.75.$$

6. The optical imaging lens according to claim 1, wherein said image-side surface of said fifth lens element further comprises a convex portion in a vicinity of a periphery of the fifth lens element.

7. The optical imaging lens according to claim 1, wherein a central thickness of the fourth lens element along the optical axis is CT4, an air gap between the third lens element and the fourth lens element along the optical axis is AC34, and CT4 and AC34 further satisfy the equation:

$$14 \ge \frac{CT4+CT5}{AC34} \ge 6.3.$$

8. The optical imaging lens according to claim 1, wherein a central thickness of the fourth lens element along the optical axis is CT4, the sum of all four air gaps from the first lens element to the fifth lens element along the optical axis is AAG, and CT4 and AAG satisfy the equation:

$$3.5 \ge \frac{CT4+CT5}{AAG} \ge 1.5.$$

9. The optical imaging lens according to claim 8, wherein said object-side surface of said second lens element further comprises a convex portion in a vicinity of the optical axis.

10. The optical imaging lens according to claim 9, wherein a central thickness of the second lens element along the optical axis is CT2, and CT2 and AAG satisfy the equation:

$$2.2 \le \frac{AAG}{CT2} \le 3.$$

11. The optical imaging lens according to claim 9, wherein an air gap between the first lens element and the second lens element along the optical axis is AC12, and AC12 and AC45 satisfy the equation:

$$3.5 \ge \frac{AC45}{AC12} \ge 0.8.$$

12. A mobile device, comprising:
a housing; and
a photography module positioned in the housing and comprising:
the optical imaging lens as claimed in claims 1;
a lens barrel for positioning the optical imaging lens;
a module housing unit for positioning the lens barrel; and
an image sensor positioned at the image side of the optical imaging lens.

13. The mobile device according to claim 12, wherein the module housing unit comprises an auto-focusing module comprising a seat element and a lens backseat, the seat element is positioned close to the outside of the lens barrel and along an axis for driving the lens barrel and the optical imaging lens positioned therein to move along the axis, and the lens backseat is positioned along the axis and around the outside of the seat element.

14. The mobile device according to claim 13, wherein the module housing unit further comprises an image sensor base positioned between the lens backseat and the image sensor which is closed to the lens backseat.

* * * * *